United States Patent
Nihei et al.

(10) Patent No.: US 7,283,151 B2
(45) Date of Patent: *Oct. 16, 2007

(54) PIXEL CLOCK GENERATION DEVICE CAUSING STATE TRANSITION OF PIXEL CLOCK ACCORDING TO DETECTED STATE TRANSITION AND PHASE DATA INDICATING PHASE SHIFT AMOUNT

(75) Inventors: Yasuhiro Nihei, Kanagawa (JP); Masaaki Ishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 10/435,034

(22) Filed: May 12, 2003

(65) Prior Publication Data

US 2004/0036762 A1 Feb. 26, 2004

(30) Foreign Application Priority Data

May 27, 2002 (JP) ............................. 2002-152028
May 27, 2002 (JP) ............................. 2002-152029

(51) Int. Cl.
*B41J 2/435* (2006.01)

(52) U.S. Cl. ..................................... 347/249

(58) Field of Classification Search ........ 347/234–237, 347/246–250, 251, 240, 229; 327/2–3, 136, 327/141, 144, 147, 149, 158, 291; 358/474; 713/500; 348/537
See application file for complete search history.

(56) References Cited

U.S. PATENT DOCUMENTS

| 4,393,387 A | * | 7/1983 | Kitamura | ..................... 347/240 |
| 4,420,761 A | * | 12/1983 | Kitamura | ..................... 347/235 |
| 4,926,263 A | * | 5/1990 | Yokota | ......................... 358/474 |
| 4,943,857 A | * | 7/1990 | Izuno et al. | ................. 348/537 |

(Continued)

FOREIGN PATENT DOCUMENTS

JP 11-167081 6/1999

(Continued)

OTHER PUBLICATIONS

U.S. Appl. No. 10/095,913, filed Mar. 13, 2002, Ema et al.

(Continued)

*Primary Examiner*—Hai Pham
(74) *Attorney, Agent, or Firm*—Oblon, Spivak, McClelland, Maier & Neustadt, P.C.

(57) ABSTRACT

A transition detection circuit detects a transition of a state of a pixel clock, and outputs a detection signal according to a timing of the detected state transition. A control signal generation circuit generates a control signal according to the detection signal and phase data indicating a transition timing of the pixel clock. A pixel clock control circuit causes the state of the pixel clock to transit according to the control signal.

40 Claims, 27 Drawing Sheets

U.S. PATENT DOCUMENTS

| | | | |
|---|---|---|---|
| 5,138,623 A | 8/1992 | Ema et al. | 372/38.07 |
| 5,237,579 A | 8/1993 | Ema et al. | 372/31 |
| 5,258,780 A | 11/1993 | Ema et al. | 347/131 |
| 5,784,091 A | 7/1998 | Ema et al. | 347/131 |
| 5,946,334 A | 8/1999 | Ema et al. | 372/38.01 |
| 6,118,798 A | 9/2000 | Ema et al. | 372/29.011 |
| 6,329,854 B1* | 12/2001 | Lee et al. | 327/158 |
| 6,498,617 B1 | 12/2002 | Ishida et al. | 514/315 |
| 2001/0019417 A1 | 9/2001 | Ueki | |
| 2001/0032323 A1* | 10/2001 | Takagi et al. | 713/500 |
| 2004/0160509 A1* | 8/2004 | Nihei et al. | 347/247 |

FOREIGN PATENT DOCUMENTS

| | | |
|---|---|---|
| JP | 2001-228415 | 8/2001 |
| JP | 2001-246777 | 9/2001 |
| JP | 2002-051032 | 2/2002 |

OTHER PUBLICATIONS

U.S. Appl. No. 10/183,748, filed Jun. 28, 2002, Nihei et al.
U.S. Appl. No. 10/214,559, filed Aug. 9, 2002, Ishida et al.
U.S. Appl. No. 10/259,769, filed Sep. 30, 2002, Omori et al.
U.S. Appl. No. 10/323,837, filed Dec. 20, 2002, Suzuki et al.
U.S. Appl. No. 10/435,034, filed May 12, 2003, Nihei et al.
U.S. Appl. No. 10/854,268, filed May 27, 2004, Ishida et al.
U.S. Appl. No. 10/803,042, filed Mar. 18, 2004, Ishida et al.
U.S. Appl. No. 10/771,521, filed Feb. 5, 2004, Nihei et al.
U.S. Appl. No. 10/667,321, filed Sep. 23, 2003, Omori et al.

* cited by examiner

PIXEL CLOCK GENERATION DEVICE CAUSING STATE TRANSITION OF PIXEL CLOCK ACCORDING TO DETECTED STATE TRANSITION AND PHASE DATA INDICATING PHASE SHIFT AMOUNT

BACKGROUND OF THE INVENTION

1. Field of the Invention

The present invention generally relates to a pixel clock generation device, a laser scanning device, and an image forming device, and more particularly, to a pixel clock generation device generating a pixel clock, a laser scanning device and an image forming device including the pixel clock generation device.

2. Description of the Related Art

FIG. 1 shows a general configuration of an image forming device, such as a laser printer and a digital composite device. In FIG. 1, a laser light emitted from a semiconductor laser unit 1009 undergoes a scanning by a rotating polygon mirror 1003, and is projected via a scanning lens 1002 on a photo conductor 1001 which is a scanned medium. The projected laser light forms an optical spot on the photo conductor 1001, thereby forming an electrostatic latent image on the photo conductor 1001. Additionally, the polygon mirror 1003 projects the laser light on a photodetector 1004 each time the scanning of one line is finished. When the laser light is projected on the photodetector 1004, the photodetector 1004 converts this laser light into an electric signal, and supplies this electric signal into a phase synchronous circuit 1006. When the electric signal is supplied, the phase synchronous circuit 1006 generates a picture clock (also referred to as a pixel clock) for next one line. Besides, the phase synchronous circuit 1006 is supplied with a high-frequency clock signal from a clock generation circuit 1005; based on the above-mentioned electric signal and the high-frequency clock signal, the picture clock with phase synchronization is generated.

The generated picture clock is supplied to an image processing unit 1007 and a laser drive circuit 1008. The image processing unit 1007 supplies image data to the laser drive circuit 1008 according to the picture clock. The laser drive circuit 1008 drives the semiconductor laser unit 1009 according to the picture clock. Thereby, the electrostatic latent image of the supplied image data is formed on the photo conductor 1001.

Thus, in the image forming device shown in FIG. 1, a light-emission time of a semiconductor laser included in the semiconductor laser unit 1009 is controlled according to the picture clock having a phase set for each line, and the electrostatic latent image on the photo conductor 1001 is controlled accordingly.

A rotating deflector, such as a polygon scanner, is used by a scanning optical system in the above-described configuration. However, the configuration using the rotating deflector has a problem that a distance between a deflective reflection plane and a rotation axis in this deflector varies, and accordingly, a scanning speed of the optical spot (i.e., a scanning beam) scanning a scanned surface becomes irregular. This scanning speed irregularity causes fluctuation in an image, resulting in a deteriorated image quality. Therefore, the scanning irregularity needs correction when a high-quality image is required.

Further, when a multi-beam optical system is used as a light source, a difference in oscillation wavelengths of light-emitting sources of the multi-beam optical system causes exposure displacements, resulting in a difference in scanning widths of optical spots corresponding to the respective light-emitting sources on a scanned medium. Therefore, the scanning width needs correction.

Japanese Laid-Open Patent Application No. 11-167081 and Japanese Laid-Open Patent Application No. 2001-228415 disclose examples of techniques for performing the above-mentioned corrections, such as a method in which an optical spot position is controlled along a scanning line by changing a frequency of a picture clock.

However, the above-mentioned conventional technique of changing the frequency of the picture clock (which is referred to as a frequency modulation method) involves a complicatedly structured picture clock control part. Additionally, this complication increases as a frequency modulation width becomes small. Thus, the frequency modulation method according to the conventional technique has a problem that a fine control cannot be performed.

SUMMARY OF THE INVENTION

It is a general object of the present invention to provide an improved and useful pixel clock generation device, a laser scanning device, and an image forming device in which the above-mentioned problems are eliminated.

A more specific object of the present invention is to provide a pixel clock generation device having a simple structure which enables a highly precise and detailed phase control of a pixel clock, and to provide a laser scanning device and an image forming device including the pixel clock generation device.

In order to achieve the above-mentioned objects, there is provided according to one aspect of the present invention a pixel clock generation device including a high-frequency clock generation circuit generating a high-frequency clock, a transition detection circuit detecting a transition of a state of a pixel clock, and outputting a detection signal according to a timing of the detected transition, a control signal generation circuit generating a control signal according to the detection signal and phase data indicating a transition timing of the pixel clock, and a pixel clock control circuit causing the state of the pixel clock to transit according to the control signal.

According to the present invention, a highly precise phase control of the pixel clock can be performed with a simple structure.

Additionally, in the pixel clock generation device according to the present invention, the detection signal may have a width of one clock of the high-frequency clock.

According to the present invention, the detection signal can be generated easily according to the high-frequency clock.

In order to achieve the above-mentioned objects, there is also provided according to another aspect of the present invention a pixel clock generation device including a high-frequency clock generation part generating a high-frequency clock, a clock generation part generating a plurality of clocks having different phases and/or periods according to phase data indicating a phase shift amount of a pixel clock, a status signal indicating a state of the pixel clock, and the high-frequency clock, and a clock selecting part selecting either of the clocks according to the phase data.

According to the present invention, a more detailed phase control of the pixel clock can be performed with a simple structure.

Additionally, in the pixel clock generation device according to the present invention, the clock generation part may generates a first clock having a state transiting upon rising of the high-frequency clock, and a second clock having a state transiting upon falling of the high-frequency clock.

According to the present invention, the phase control of the pixel clock can be performed at a pitch of half the width of the high-frequency clock.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

<Principle>

First, a description will be given of a principle of the present invention.

The present invention is for performing a highly precise phase control of a pixel clock with a simple structure. Accordingly, in the present invention, a transition of a pixel clock (PCLK) is detected; then, based on the detected transition of the pixel clock (PCLK) and phase data indicating a shift amount of a phase of the pixel clock (PCLK), a control signal controlling the transition of the pixel clock (PCLK) is generated. Further, based on this control signal, a state of the pixel clock (PCLK) is caused to undergo a transition.

Therefor, in the present invention, for example, a detection signal output according to a timing of the transition of the pixel clock (PCLK) is shifted by a shift register having a plurality of steps of outputs, and either of these outputs is selected and output by a multiplexer. In this course, the multiplexer performs the selection based on the phase data. Further, shiffting the detection signal at a finer pitch enables the phase control of the pixel clock (PCLK) to be performed in further detail with more exactness.

Accordingly, in the present invention, a pixel clock generation device (a pixel clock generation part) can have a simple structure.

Additionally, performing the above-described procedures according to a high-frequency clock (VCLK) enables the phase of the pixel clock (PCLK) to be controlled with a higher precision.

Hereinafter, descriptions will be given of the embodiments according to the present invention.

EMBODIMENT 1

Figure 1:
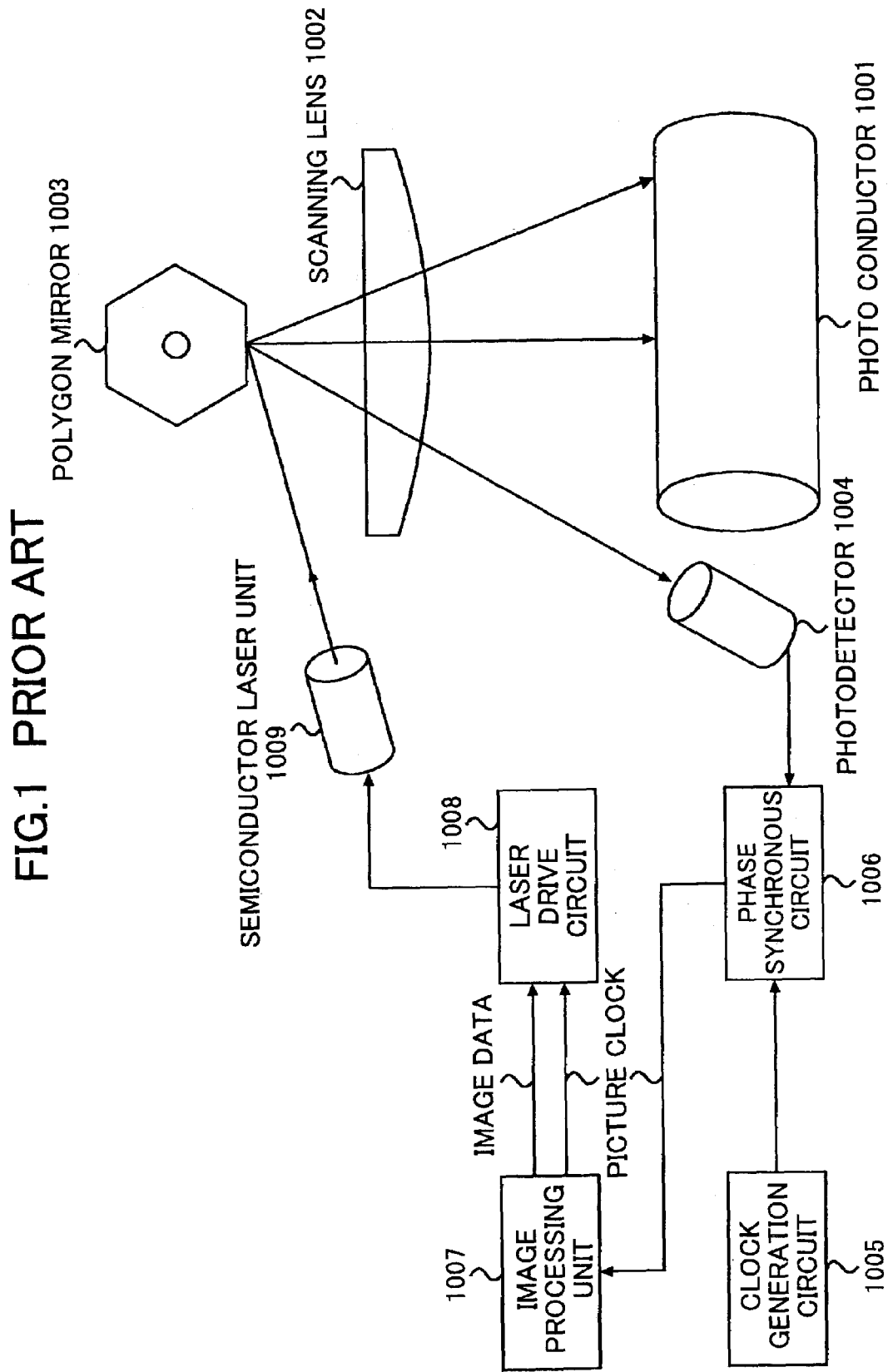
FIG. 1 is a diagram showing a general configuration of a conventional image forming device.
Figure 2:
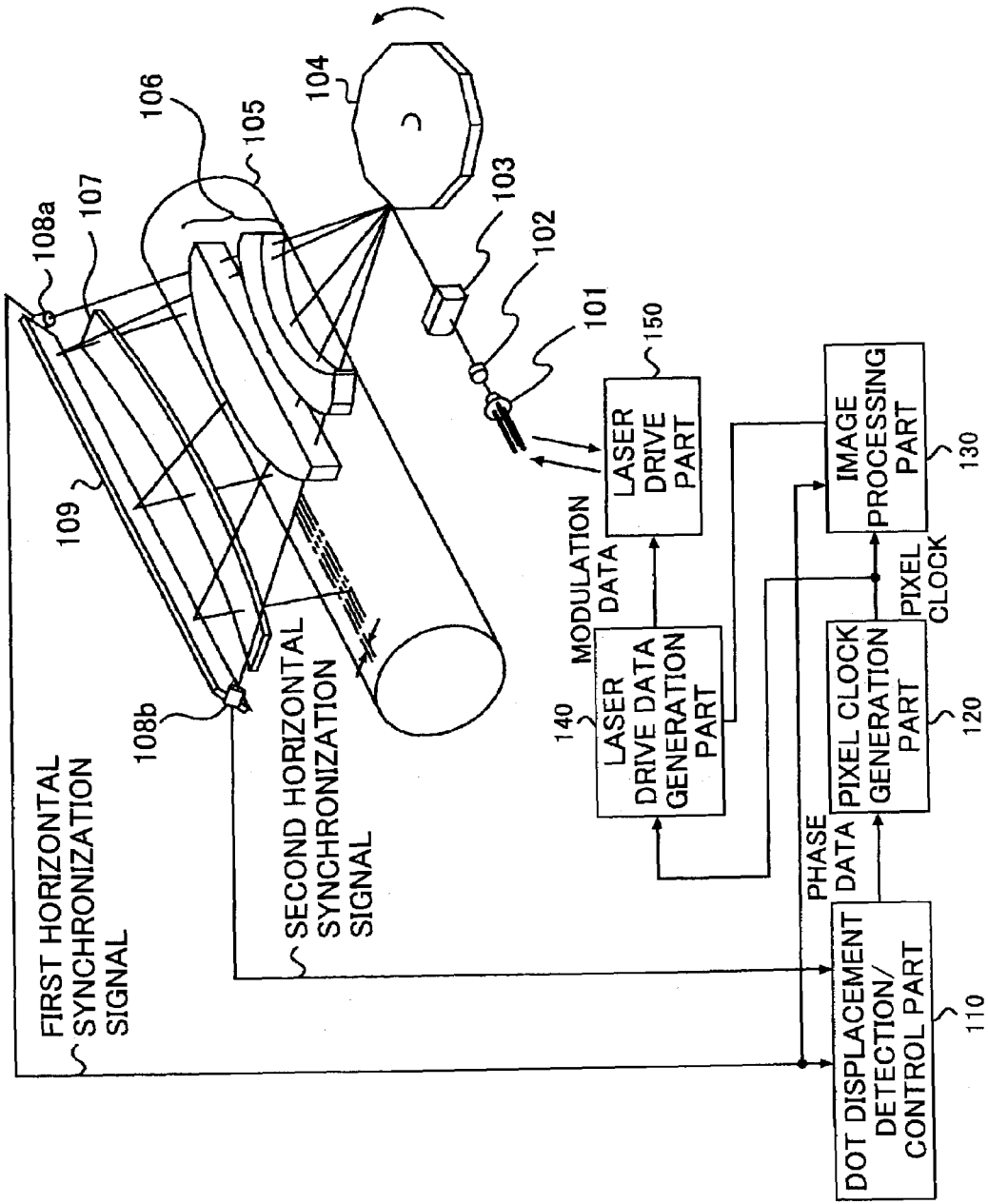
FIG. 2 is a diagram showing a configuration of an image forming device according to the present invention.

First, a description will be given, with reference to FIG. 2, of a first embodiment according to the present invention. FIG. 2 shows an overall configuration of an image forming device 100 according to the present invention.

CONFIGURATION OF EMBODIMENT 1

As shown in FIG. 2, the image forming device 100 includes a semiconductor laser 101 driven by a laser drive part 150 so as to emit a laser light having an arbitrary time width. The laser light emitted from the semiconductor laser 101 is shaped via a collimator lens 102 and a cylinder lens 103, and thereafter, enters a polygon mirror 104 so as to be reflected so that the laser light scans on a photo conductor 105 with periodicity. In this course, before the reflected laser light is projected on the photo conductor 105, an optical axis of the laser light is bent via an $f^\theta$ lens 106, a mirror 109 and a toroidal lens 107.

The laser light having the bent optical axis is projected on the photo conductor 105, and forms an optical spot thereon. Thereby, an image (an electrostatic latent image) is formed on the photo conductor 105 according to the emission of the semiconductor laser 101.

Additionally, photodetectors 108a and 108b are provided at both ends of the mirror 109 so as to detect a start and an end of a scanning, respectively. Specifically, the laser light reflected in a predetermined direction by the polygon mirror 104 is caused to enter the photodetector 108a at a starting side before scanning one line on the photo conductor 105, and is caused to enter the photodetector 108b after the scanning. The photodetectors 108a and 108b convert the laser light into respective electric signals (first/second horizontal synchronization signals), and supply the respective electric signals to a dot displacement detection/control part 110. Thus, a timing of a start of a scanning on each line and a timing of an end of the scanning are supplied to the dot displacement detection/control part 110. Additionally, the first horizontal synchronization signal output from the photodetector 108a is supplied also to an image processing part 130 as a line synchronization signal.

In the dot displacement detection/control part 110, a time interval of the two electric signals supplied from the photodetectors 108a and 108b is measured, and based on this measured value, a shift amount of scanning time is calculated for each line. This process may be performed according to a method of comparing the measured time interval with a preset reference time, for example.

The dot displacement detection/control part 110 generates phase data for correcting the calculated shift amount. This phase data is used for correcting a scanning irregularity originating from a characteristic of an optical system composed of a scanning lens and so forth, for correcting a dot displacement caused by a rotation irregularity of the polygon mirror 104, and for correcting a dot displacement resulting from chromatic aberration of the laser light, and indicates a shift amount of a phase of a pixel clock. The generated phase data is supplied to a pixel clock generation part 120.

Based on the supplied phase data, the pixel clock generation part 120 generates a pixel clock (PCLK) used as a timing upon driving the semiconductor laser 101. Structures of the pixel clock generation part 120 will be described in detail with reference to the corresponding drawings. The generated pixel clock (PCLK) is supplied to the image processing part 130 and a laser drive data generation part 140.

Based on the pixel clock (PCLK), the image processing part 130 generates image data, and supplies this image data to the laser drive data generation part 140. Based on the pixel clock (PCLK), the laser drive data generation part 140 generates laser drive data (modulation data) from the supplied image data, and supplies this laser drive data to the laser drive part 150. The laser drive part 150 drives the semiconductor laser 101 according to the supplied laser drive data. Accordingly, an image without a scanning width fluctuation is formed on the photo conductor 105.

Pixel Clock Generation Part 120

Figure 3:
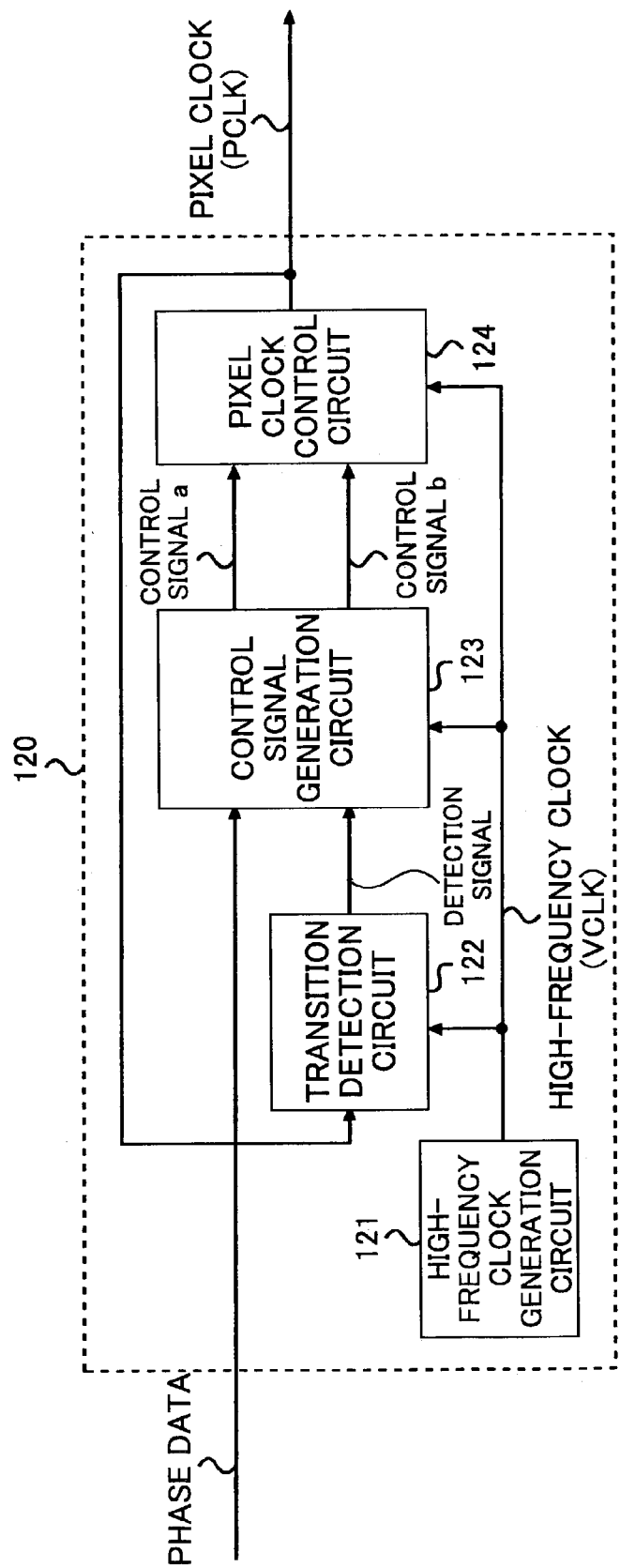
FIG. 3 is a block diagram showing a structure of a pixel clock generation part shown in FIG. 2 according to a first embodiment of the present invention.

Next, detailed descriptions will be given, with reference to the corresponding drawings, of the pixel clock generation part 120 included in the above-described image forming device 100. FIG. 3 is a block diagram showing a structure of the pixel clock generation part 120 according to the first embodiment of the present invention.

As shown in FIG. 3, the pixel clock generation part 120 comprises a high-frequency clock generation circuit 121, a transition detection circuit 122, a control signal generation circuit 123, and a pixel clock control circuit 124.

In the above-described structure, the high-frequency clock generation circuit 121 generates a high-frequency clock (VCLK) which is a reference signal for the pixel clock (PCLK), and supplies this high-frequency clock (VCLK) to the transition detection circuit 122, the control signal generation circuit 123 and the pixel clock control circuit 124. The transition detection circuit 122 detects a rise or fall of the pixel clock (PCLK) fed back from the pixel clock control circuit 124, and outputs a pulse signal (a detection signal) having a width of one clock of the high-frequency clock (VCLK). Based on the detection signal output from the transition detection circuit 122 and the phase data supplied from the dot displacement detection/control part 110 (shown in FIG. 2), the control signal generation circuit 123 outputs a control signal a and a control signal b. Based on the control signal a and the control signal b, the pixel clock control circuit 124 outputs the pixel clock (PCLK) with a controlled transition timing.

Control Signal Generation Circuit 123

Figure 4:
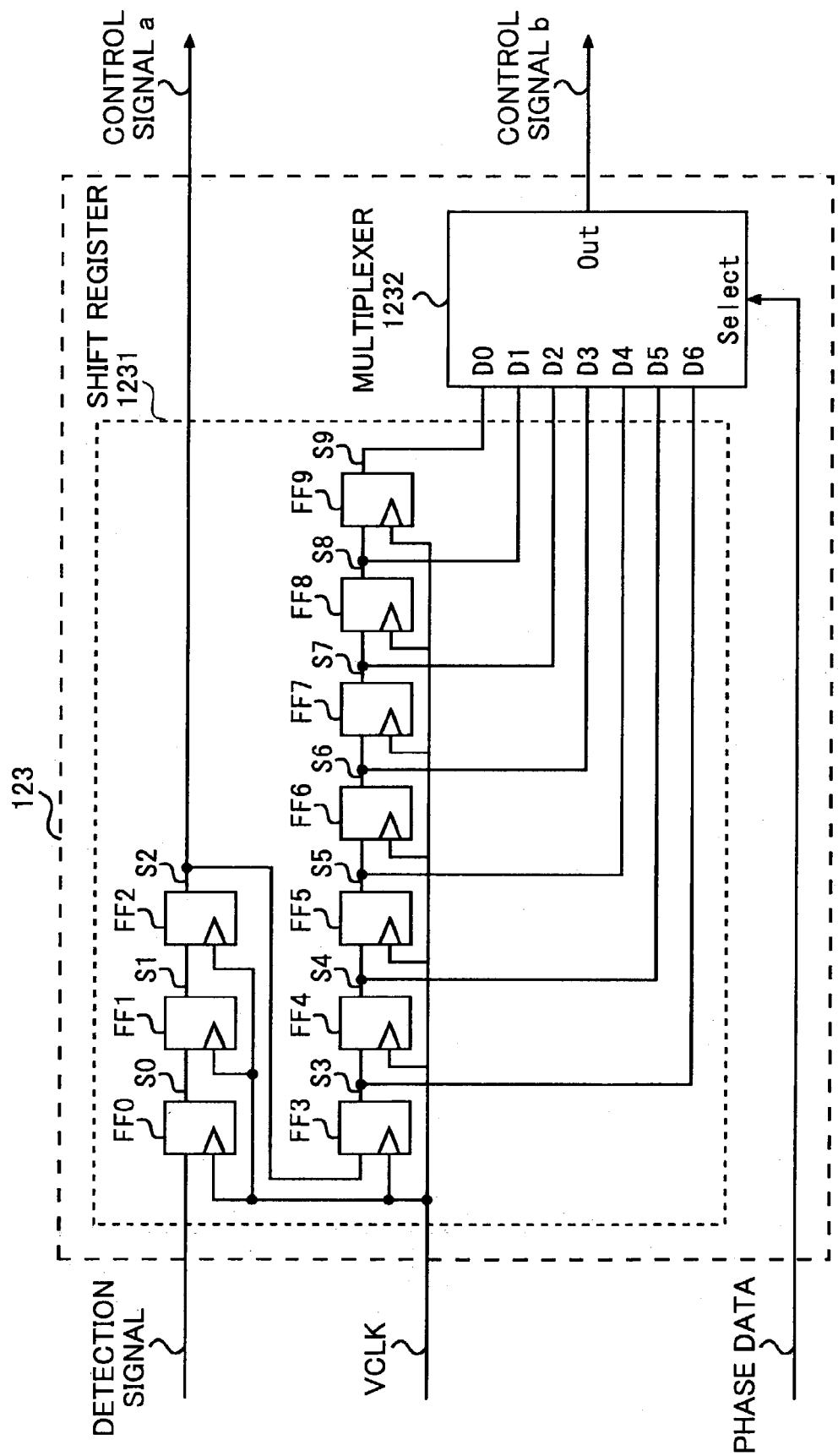
FIG. 4 is a circuit diagram showing a structure of a control signal generation circuit shown in FIG. 3.

Here, a description will be given, with reference to FIG. 4, of a circuit structure of the control signal generation circuit 123 shown in FIG. 3. As shown in FIG. 4, the control signal generation circuit 123 comprises a shift register 1231 and a multiplexer 1232. The shift register 1231 is composed of a plurality of steps of flip-flops (FFs; ten steps of FF0–FF9 in FIG. 4 for example). The multiplexer 1232 selectively outputs either of signals output from the FFs composing the shift register 1231. Besides, when no phase shift exists, the shift register 1231 shown in FIG. 4 generates the pixel clock (PCLK) with a duty ratio of 50% which is equivalent to an eight-divided frequency of the high-frequency clock (VCLK).

In this structure, the shift register 1231 operates according to the high-frequency clock (VCLK), and shifts the detection signal supplied from the transition detection circuit 122. Signals S3–S9 output from FF3–FF9, for example, are supplied to channels D0–D6 of the multiplexer 1232, and the phase data is supplied from the dot displacement detection/control part 110 to "Select" of the multiplexer 1232. According to this data, the multiplexer 1232 selects either of the channels supplied with the signals S3–S9, and outputs the signal supplied to the selected channel as the control signal b (a second control signal) from "Out". Besides, Table 1 below shows an example of relationship between the phase data created as 3-bit data, for example, and the channel selected by the multiplexer 1232.

TABLE 1

| Phase data (3-bit) | Out |
| --- | --- |
| 000 | D0 |
| 001 | D1 |
| 010 | D2 |
| 011 | D3 |
| 100 | D4 |
| 101 | D5 |
| 110 | D6 |

In addition, a signal S2 from FF2 of the shift register 1231 is output as the control signal a (a first control signal). Besides, the shift register 1231 forms a first control signal outputting part outputting the first control signal, and the shift register 1231 and the multiplexer 1232 form a second control signal outputting part outputting the second control signal.

Pixel Clock Control Circuit 124

Figure 5:
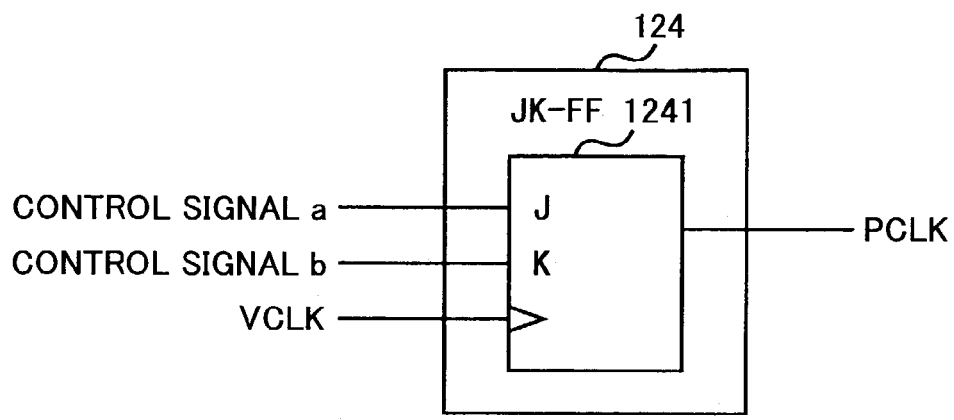
FIG. 5 is a circuit diagram showing a structure of a pixel clock control circuit shown in FIG. 3.

Besides, a description will be given, with reference to FIG. 5, of a circuit structure of the pixel clock control circuit 124 shown in FIG. 3. As shown in FIG. 5, the pixel clock control circuit 124 comprises a JK-FF 1241. In this structure, when the control signal a is 'H' (high-level), and the control signal b is 'L' (low-level), the pixel clock control circuit 124 outputs 'H' upon rising of the high-frequency clock (VCLK). On the other hand, when the control signal a is 'L', and the control signal b is 'H', the pixel clock control circuit 124 outputs 'L' upon rising of the high-frequency clock (VCLK).

According to this operation, the pixel clock corrected according to the control signals a and b (the phase data) can be output.

Another Structure of Pixel Clock Control Circuit 124

Figure 6:
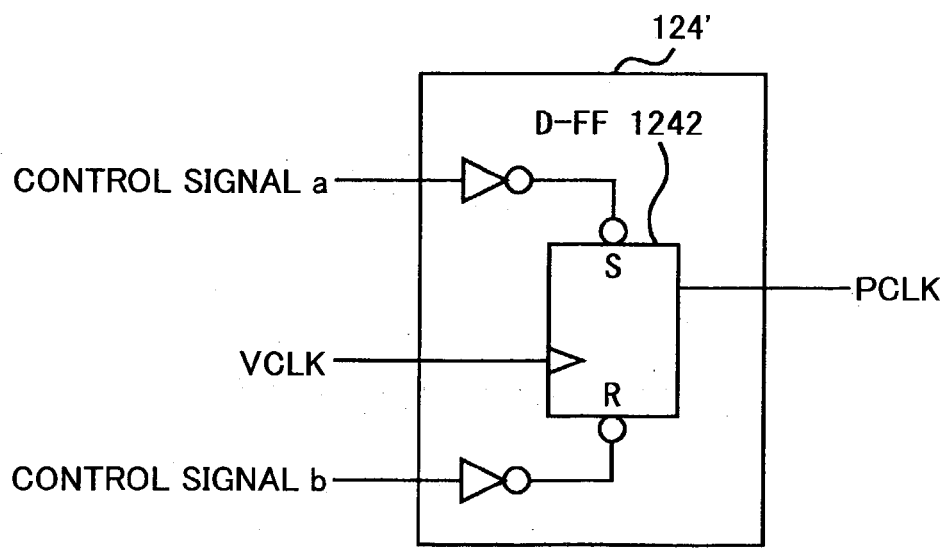
FIG. 6 is a circuit diagram showing another circuit structure of the pixel clock control circuit shown in FIG. 3.

Further, a description will be given, with reference to FIG. 6, of another circuit structure of the pixel clock control circuit 124 as a pixel clock control circuit 124'. As shown in FIG. 6, the pixel clock control circuit 124' comprises a D-FF 1242 with a clock-synchronous set/reset function. In this structure, when the control signal a is 'H', and the control signal b is 'L', the pixel clock control circuit 124' outputs 'H' upon rising of the high-frequency clock (VCLK). On the other hand, when the control signal a is 'L', and the control signal b is 'H', the pixel clock control circuit 124' outputs 'L' upon rising of the high-frequency clock (VCLK).

OPERATION OF EMBODIMENT 1

Figure 7:
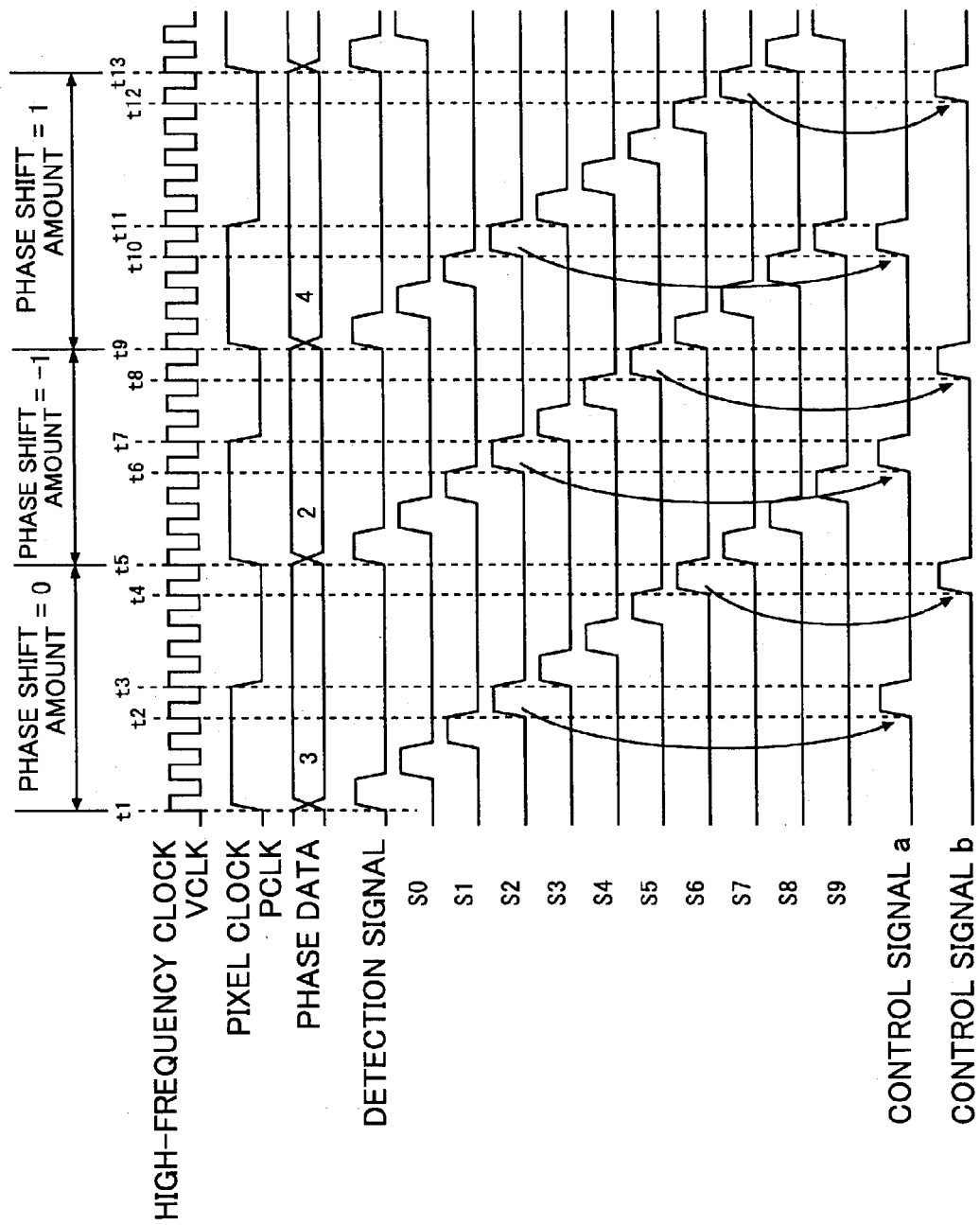
FIG. 7 is a timing chart showing operations of the pixel clock generation part shown in FIG. 3.

Next, a description will be given, with reference to a timing chart of FIG. 7, of operations of the pixel clock generation part 120. FIG. 7 shows examples of respective cases where phase shift amounts are '0', '−1' and '+1'. Besides, Table 2 below shows correspondences between the phase shift amounts and the phase data.

TABLE 2

| Phase shift amount | Phase data |
| --- | --- |
| 0 (no phase shift) | 011 |
| Advance 1/8 PCLK | 100 |
| Advance 2/8 PCLK | 101 |
| Advance 3/8 PCLK | 110 |
| Delay 1/8 PCLK | 010 |
| Delay 2/8 PCLK | 001 |
| Delay 3/8 PCLK | 000 |

Phase Shift Amount=0

First, a description will be given of the case of generating the pixel clock (PCLK) with the phase shift amount being '0'. In this case, the phase data "3" is supplied to the control signal generation circuit 123 at a timing t1 synchronous with a rise of the pixel clock (PCLK). At the same timing t1, the rise of the pixel clock (PCLK) is detected by the transition detection circuit 122 so that a detection signal is generated, and is supplied to the control signal generation circuit 123. In the control signal generation circuit 123, the detection signal is shifted by the shift register 1231. Besides, the signals S0–S9 output from the flip-flops FF0–FF9 of the shift register 1231 have shifted waveforms as shown in FIG. 7.

Since the control signal a output from the control signal generation circuit 123 is always the signal S2, a state of the control signal a rises to 'H' at a timing t2. Accordingly, since the control signal a is 'H' at a timing t3, the pixel clock control circuit 124 causes the pixel clock (PCLK) to transit down from 'H' to 'L' at this timing t3.

Next, since the phase data "3" is supplied to the control signal generation circuit 123, the multiplexer 1232 of the control signal generation circuit 123 selects the channel D3 supplied with the signal S6, and outputs the signal S6 as the control signal b. Thus, the control signal b output from the control signal generation circuit 123 rises to 'H' at a timing t4. Accordingly, since the control signal b is 'H' at a timing t5, the pixel clock control circuit 124 causes the pixel clock (PCLK) to transit up from 'L' to 'H' at this timing t5.

Thus, causing the pixel clock (PCLK) to undergo the above-described transition enables the pixel clock (PCLK) with the phase shift amount being '0' to be output from the pixel clock generation part 120.

Phase Shift Amount=−1

Next, a description will be given of the case of generating the pixel clock (PCLK) with the phase shift amount being '−1'. In this case, the phase data "2" is supplied to the control signal generation circuit 123 at the timing t5 synchronous with the rise of the pixel clock (PCLK). At the same timing t5, the rise of the pixel clock (PCLK) is detected by the transition detection circuit 122 so that a detection signal is generated, and is supplied to the control signal generation circuit 123. In the control signal generation circuit 123, the detection signal is shifted by the shift register 1231. Besides, the signals S0–S9 output from the flip-flops FF0–FF9 of the shift register 1231 have shifted waveforms as shown in FIG. 7. As in the foregoing case, since the control signal a output from the control signal generation circuit 123 is always the signal S2, the control signal a rises to 'H' at a timing t6.

Accordingly, since the control signal a is 'H' at a timing t7, the pixel clock control circuit 124 causes the pixel clock (PCLK) to transit down from 'H' to 'L' at this timing t7.

Next, since the phase data "2" is supplied to the control signal generation circuit 123, the multiplexer 1232 of the control signal generation circuit 123 selects the channel D2 supplied with the signal S5, and outputs the signal S5 as the control signal b. Thus, the control signal b output from the control signal generation circuit 123 rises to 'H' at a timing t8. Accordingly, since the control signal b is 'H' at a timing t9, the pixel clock control circuit 124 causes the pixel clock (PCLK) to transit up from 'L' to 'H' at this timing t9.

Thus, causing the pixel clock (PCLK) to undergo the above-described transition enables the pixel clock (PCLK) with the phase shift amount being '−1' to be output from the pixel clock generation part 120.

Phase Shift Amount=1

Next, a description will be given of the case of generating the pixel clock (PCLK) with the phase shift amount being '1'. In this case, the phase data "4" is supplied to the control signal generation circuit 123 at the timing t9 synchronous with the rise of the pixel clock (PCLK). At the same timing t9, the rise of the pixel clock (PCLK) is detected by the transition detection circuit 122 so that a detection signal is generated, and is supplied to the control signal generation circuit 123. In the control signal generation circuit 123, the detection signal is shifted by the shift register 1231. Besides, the signals S0–S9 output from the flip-flops FF0–FF9 of the shift register 1231 have shifted waveforms as shown in FIG. 7. As in the foregoing case, since the control signal a output from the control signal generation circuit 123 is always the signal S2, the control signal a rises to 'H' at a timing t10.

Accordingly, since the control signal a is 'H' at a timing t11, the pixel clock control circuit 124 causes the pixel clock (PCLK) to transit down from 'H' to 'L' at this timing t11.

Next, since the phase data "4" is supplied to the control signal generation circuit 123, the multiplexer 1232 of the control signal generation circuit 123 selects the channel D4 supplied with the signal S7, and outputs the signal S7 as the control signal b. Thus, the control signal b output from the control signal generation circuit 123 rises to 'H' at a timing t12. Accordingly, since the control signal b is 'H' at a timing t13, the pixel clock control circuit 124 causes the pixel clock (PCLK) to transit up from 'L' to 'H' at this timing t13.

Thus, causing the pixel clock (PCLK) to undergo the above-described transition enables the pixel clock (PCLK) with the phase shift amount being '1' to be output from the pixel clock generation part 120.

As described above, according to the present first embodiment, supplying the phase data in synchronization with the pixel clock (PCLK) enables the phase of the pixel clock to be changed on an individual pixel clock (PCLK) basis. Thus, the present first embodiment enables a highly precise phase control of the pixel clock (PCLK) to be performed with the simple structure.

EMBODIMENT 2

Figure 8:
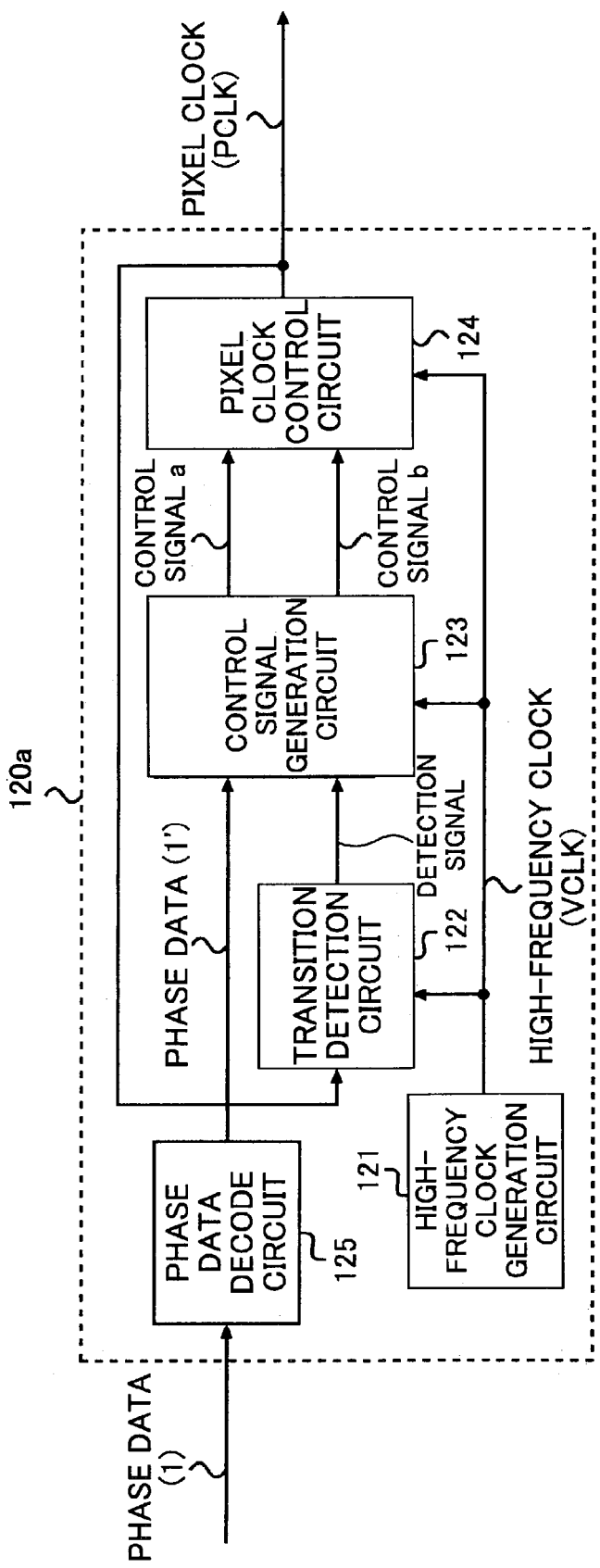
FIG. 8 is a block diagram showing a structure of a pixel clock generation part according to a second embodiment of the present invention.

Next, a description will be given of another structure of the pixel clock generation part 120 according to the foregoing first embodiment as a second embodiment according to the present invention. FIG. 8 is a block diagram showing the structure of a pixel clock generation part 120a according to the present second embodiment.

As shown in FIG. 8, the pixel clock generation part 120a further comprises a phase data decode circuit 125 in addition to the structure of the pixel clock generation part 120 according to the foregoing first embodiment. This phase data decode circuit 125 converts phase data (1) from outside (for example, the dot displacement detection/control part 110 shown in FIG. 2) into phase data (1') inside the pixel clock generation part 120a. In the present embodiment, it is assumed that the phase shift amounts and the phase data (1) outside have correspondences as shown in Table 3 below.

TABLE 3

| Phase shift amount | Phase data (1) |
|---|---|
| 0 (no phase shift) | 000 |
| Advance 1/8 PCLK | 001 |
| Advance 2/8 PCLK | 010 |
| Advance 3/8 PCLK | 011 |

TABLE 3-continued

| Phase shift amount | Phase data (1) |
|---|---|
| Delay 1/8 PCLK | 111 |
| Delay 2/8 PCLK | 110 |
| Delay 3/8 PCLK | 101 |

The phase data decode circuit 125 decodes the supplied phase data (1) according to Table 4 below, and supplied the phase data (1') obtained by this decoding to the control signal generation circuit 123.

AS described above, according to the present second embodiment, the phase data decode circuit 125 converts phase data outside the pixel clock generation part 120a into inside phase data. Therefore, the phase data corresponding to the phase shift amounts can be assigned arbitrary outside; thus, it becomes possible to apply phase data easy to be processed for an external control device and so forth.

TABLE 4

| Phase data (1) (3-bit) | Decode output |
|---|---|
| 000 | 011 |
| 001 | 100 |
| 010 | 101 |
| 011 | 110 |
| 111 | 010 |
| 110 | 001 |
| 101 | 000 |

Besides, since other structures and operations of the present second embodiment are the same as the foregoing first embodiment, a description thereof is omitted herein.

EMBODIMENT 3

Figure 9:
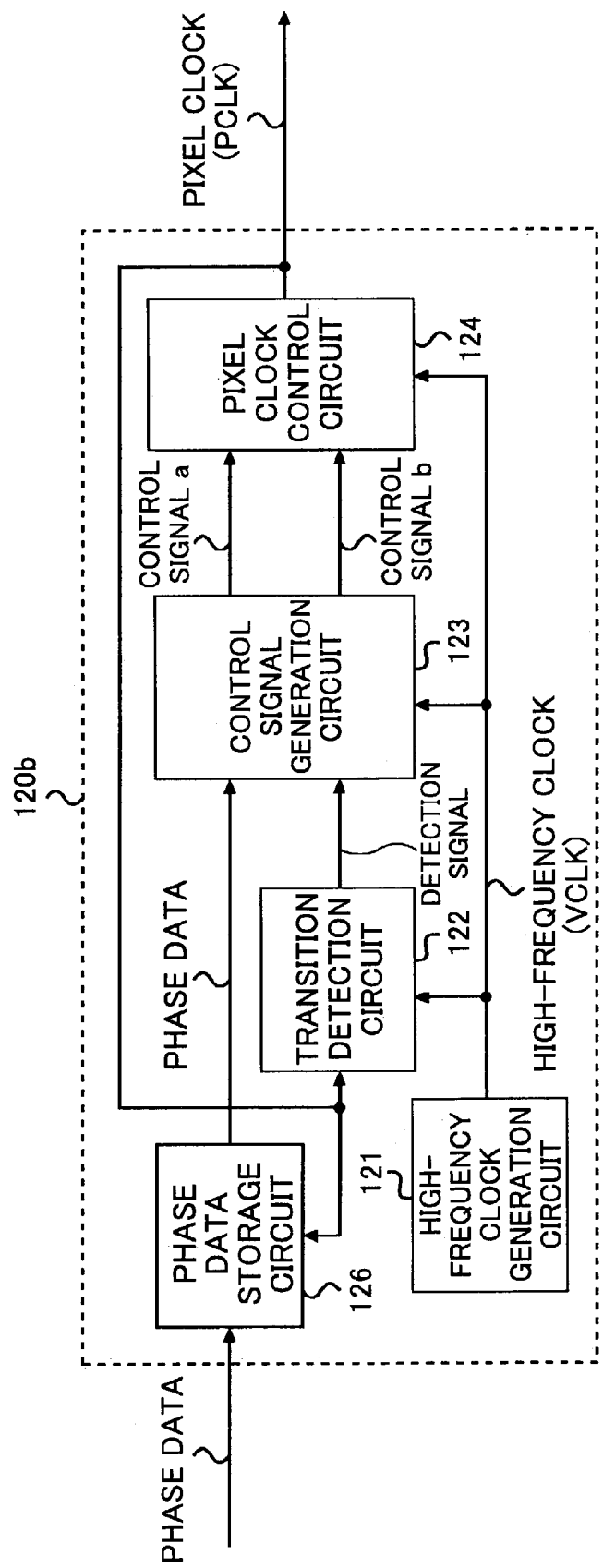
FIG. 9 is a block diagram showing a structure of a pixel clock generation part according to a third embodiment of the present invention.

Next, a description will be given of another structure of the pixel clock generation part 120 according to the foregoing first embodiment as a third embodiment according to the present invention. FIG. 9 is a block diagram showing the structure of a pixel clock generation part 120b according to the present third embodiment.

As shown in FIG. 9, the pixel clock generation part 120b further comprises a phase data storage circuit 126 for storing a plurality of phase data, in addition to the structure of the pixel clock generation part 120 according to the foregoing first embodiment. A plurality of phase data are preset in this phase data storage circuit 126 from outside and so forth. Accordingly, upon operation, the phase data storage circuit 126 reads the phase data one by one in synchronization with the pixel clock (PCLK), and supplies the phase data to the control signal generation circuit 123. Besides, the phase data storage circuit 126 includes an address counter.

As described above, according to the present third embodiment, phase data are stored beforehand in the phase data storage circuit 126. Accordingly, when using fixed data, the fixed data can be stored beforehand in the phase data storage circuit 126, thereby alleviating a load imposed on an external control circuit and so forth. Specifically, for example, when correcting a scanning irregularity originating from a characteristic of a scanning lens, phase data becomes equal for each line; thus, phase data for each line may be stored beforehand in the phase data storage circuit 126. Then, each time a line is scanned, the phase data can be read one by one from a start address of the phase data storage circuit 126, and be supplied to the control signal generation circuit 123. Therefore, it becomes unnecessary to supply phase data for each line from outside, thereby alleviating a load imposed on an external control circuit and so forth.

Besides, since other structures and operations of the present third embodiment are the same as the foregoing first embodiment, a description thereof is omitted herein.

EMBODIMENT 4

Figure 10:
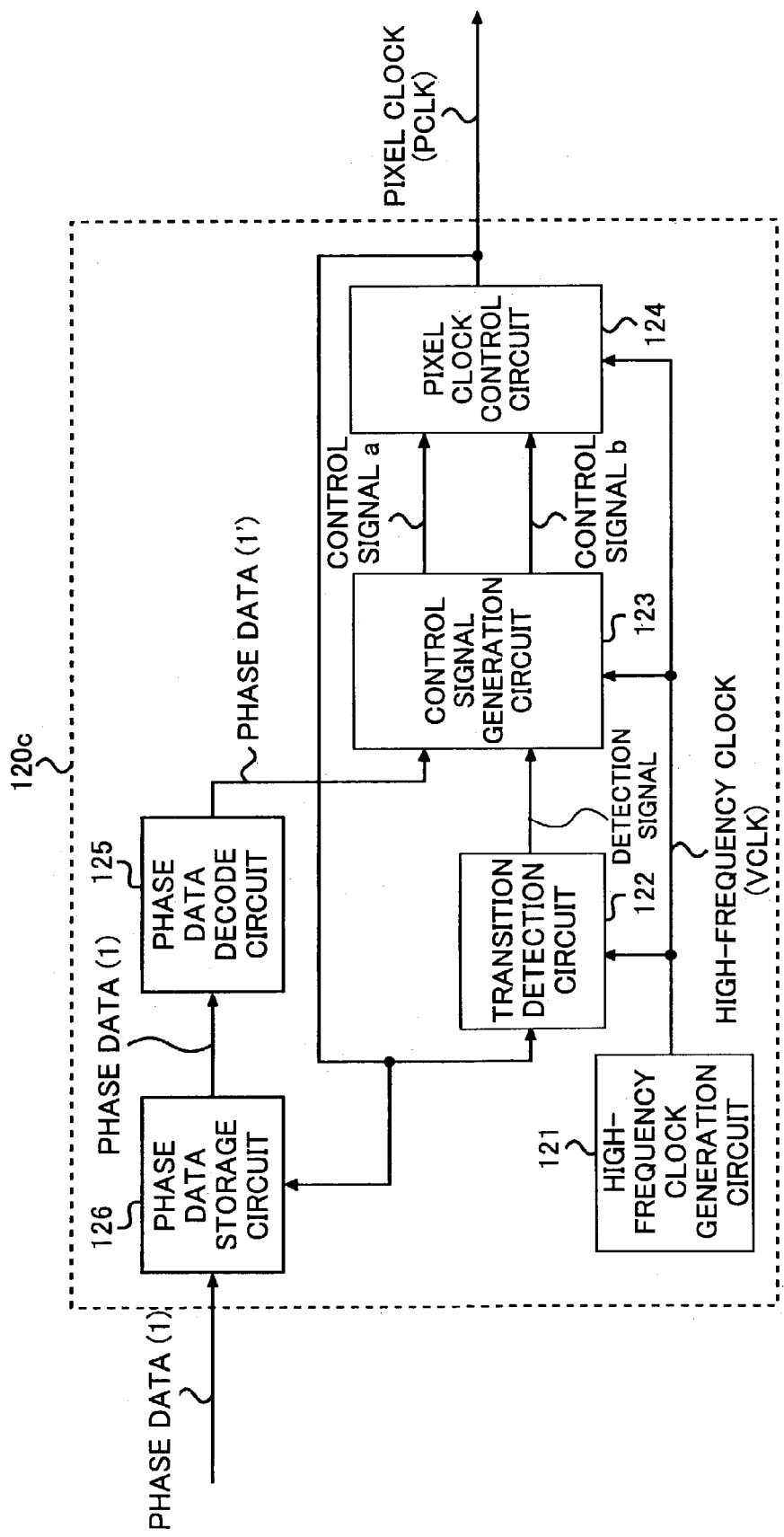
FIG. 10 is a block diagram showing a structure of a pixel clock generation part according to a fourth embodiment of the present invention.

Further, a description will be given of another structure of the pixel clock generation part 120 according to the foregoing first embodiment as a fourth embodiment according to the present invention. FIG. 10 is a block diagram showing the structure of a pixel clock generation part 120c according to the present fourth embodiment.

As shown in FIG. 10, the pixel clock generation part 120c further comprises the phase data decode circuit 125, and the phase data storage circuit 126 at a preceding step of the phase data decode circuit 125, in addition to the structure of the pixel clock generation part 120 according to the foregoing first embodiment. That is, the pixel clock generation part 120c is a combination of the pixel clock generation part 120a according to the second embodiment and the pixel clock generation part 120b according to the third embodiment.

Accordingly, a plurality of phase data (1) are preset in the phase data storage circuit 126 from outside and so forth, and are read one by one in synchronization with the pixel clock (PCLK) so as to be supplied to the phase data decode circuit 125. The phase data decode circuit 125 converts the phase data (1) supplied from the phase data storage circuit 126 into phase data (1'), as in the foregoing second embodiment, and supplies this phase data (1') to the control signal generation circuit 123.

As described above, according to the present fourth embodiment, the phase data storage circuit 126 stores beforehand the phase data (1), and the phase data decode circuit 125 converts the phase data (1) outside the pixel clock generation part 120a into the inside phase data (1'). Accordingly, when using fixed data, such as phase data becoming equal for each line to correct a scanning irregularity originating from a characteristic of a scanning lens, the fixed data can be stored beforehand in the phase data storage circuit 126, thereby alleviating a load imposed on an external control circuit and so forth. Further, the phase data corresponding to the phase shift amounts can be assigned arbitrarily outside; thus, it becomes possible to apply phase data easy to be processed for an external control device and so forth.

Besides, since other structures and operations of the present fourth embodiment are the same as the foregoing first embodiment, a description thereof is omitted herein.

EMBODIMENT 5

Figure 11:
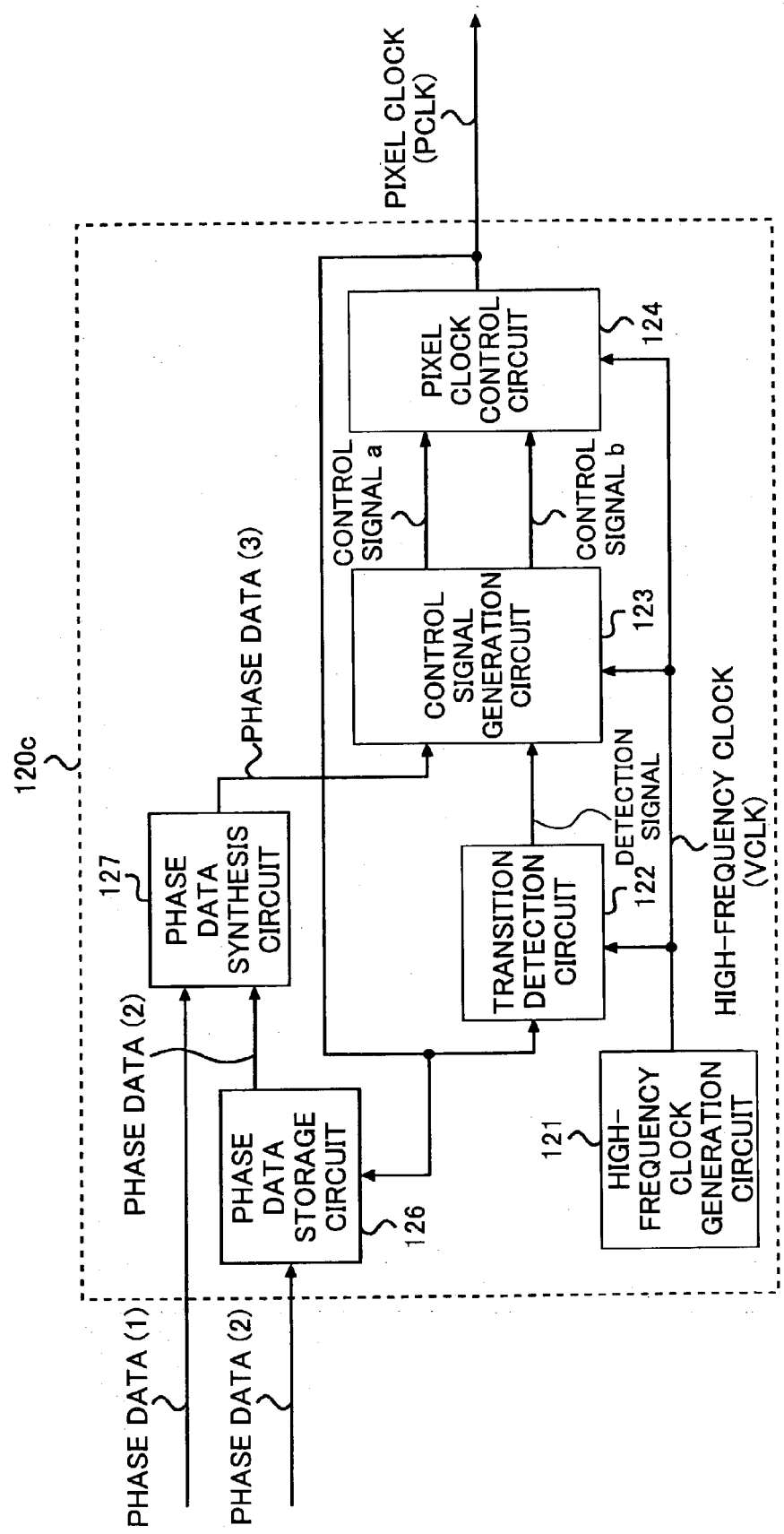
FIG. 11 is a block diagram showing a structure of a pixel clock generation part according to a fifth embodiment of the present invention.

Further, a description will be given of another structure of the pixel clock generation part 120 according to the foregoing first embodiment as a fifth embodiment according to the present invention. FIG. 11 is a block diagram showing the structure of a pixel clock generation part 120d according to the present fifth embodiment.

As shown in FIG. 11, the pixel clock generation part 120d further comprises the phase data storage circuit 126 and a phase data synthesis circuit 127, in addition to the structure of the pixel clock generation part 120 according to the foregoing first embodiment. The phase data storage circuit 126 stores beforehand a plurality of phase data (2) (corresponding to first phase data) preset from outside and so forth. The phase data synthesis circuit 127 supplies the control signal generation circuit 123 with phase data (3) synthesized from the phase data (2) output from the phase data storage circuit 126 and phase data (1) (corresponding to second phase data) directly supplied from outside. That is, the pixel clock generation part 120d stores the phase data (2) beforehand by using the phase data storage circuit 126 of the foregoing third embodiment, and synthesizes this phase data (2), and the phase data (1) supplied from outside for each line, so as to create the phase data (3) used for performing actual correction, by the phase data synthesis circuit 127.

In the present embodiment, assuming that the phase shift amounts and the phase data have correspondences as shown in Table 2 above, for example, the phase data synthesis circuit 127 creates the phase data (3) by performing a calculation as an expression 1 shown below.

$$\text{Phase data (3)=phase data (1)+phase data (2)-3} \quad \text{(Expression 1)}$$

As described above, according to the present fifth embodiment, the phase data synthesis circuit 127 synthesizes the phase data (2) stored beforehand for performing fixed correction and the phase data (1) for performing arbitrary correction. Accordingly, it becomes possible to correct both a fixed scanning irregularity, such as a scanning irregularity originating from a characteristic of a scanning lens, and a varying scanning irregularity varying for each line, such as a rotation irregularity of the polygon mirror newly supplied from the dot displacement detection/control part 110 as phase data (1).

Besides, since other structures and operations of the present fifth embodiment are the same as the foregoing first embodiment, a description thereof is omitted herein.

EMBODIMENT 6

Figure 12:
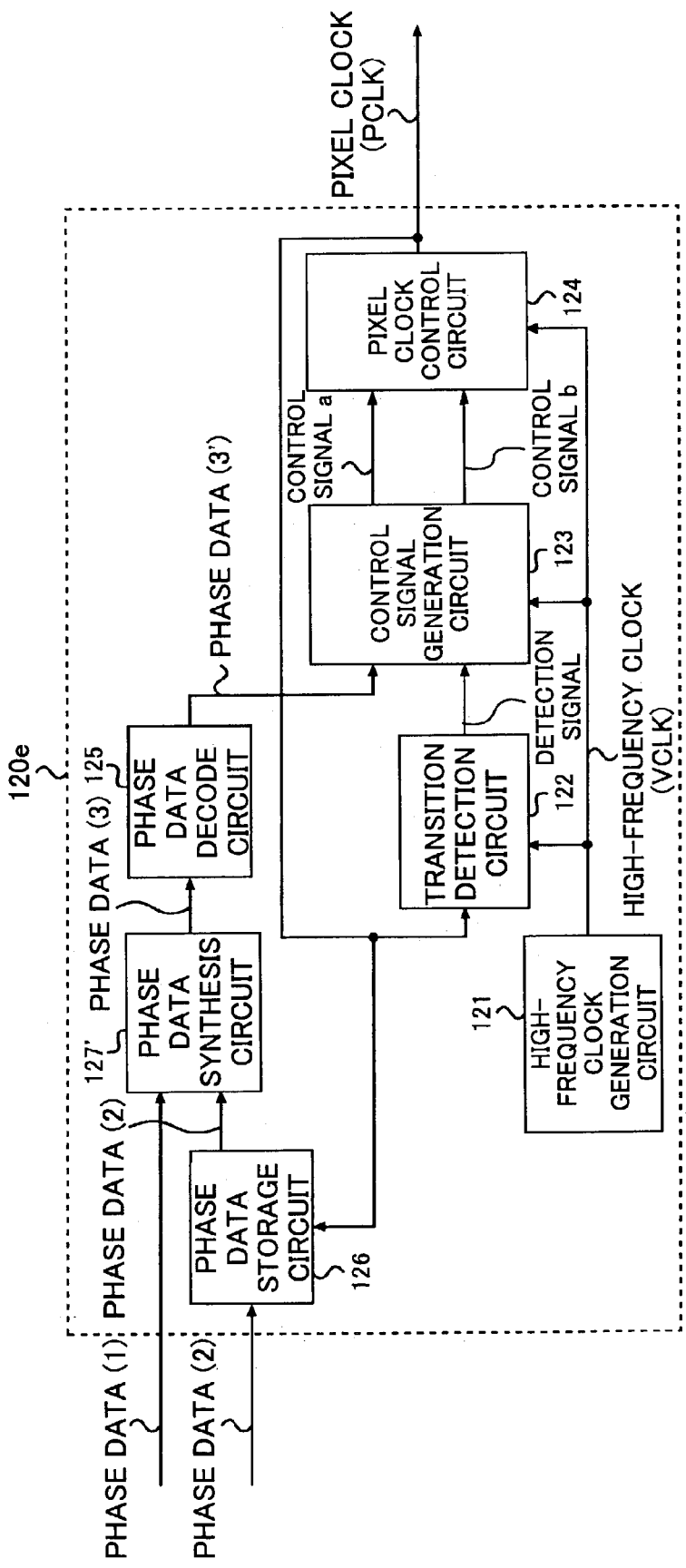
FIG. 12 is a block diagram showing a structure of a pixel clock generation part according to a sixth embodiment of the present invention.

Further, a description will be given of another structure of the pixel clock generation part 120 according to the foregoing first embodiment as a sixth embodiment according to the present invention. FIG. 12 is a block diagram showing the structure of a pixel clock generation part 120e according to the present sixth embodiment.

As shown in FIG. 12, the pixel clock generation part 120e further comprises the phase data storage circuit 126, a phase data synthesis circuit 127' and the phase data decode circuit 125, in addition to the structure of the pixel clock generation part 120 according to the foregoing first embodiment. The phase data storage circuit 126 stores beforehand a plurality of phase data (2) preset from outside and so forth. The phase data synthesis circuit 127' supplies the phase data decode circuit 125 with phase data (3) synthesized from the phase data (2) output from the phase data storage circuit 126 and phase data (1) directly supplied from outside. The phase data decode circuit 125 converts the phase data (3) supplied from the phase data synthesis circuit 127' into phase data (3'), and supplies this phase data (3') to the control signal generation circuit 123. That is, the pixel clock generation part 120e further comprises the phase data decode circuit 125 at the output of the phase data synthesis circuit 127', in addition to the structure of the pixel clock generation part 120d according to the foregoing fifth embodiment.

The phase data synthesis circuit 127' according to the present sixth embodiment creates the phase data (3) by performing a calculation as an expression 2 shown below.

$$\text{Phase data (3)=phase data (1)+phase data (2)} \quad \text{(Expression 2)}$$

The phase data decode circuit 125 according to the present sixth embodiment is supplied with the phase data (3) from the phase data synthesis circuit 127', converts the phase data (3) into the phase data (3') according to correspondences shown in Table 4 above, and supplies this phase data (3') to the control signal generation circuit 123.

As described above, according to the present sixth embodiment, the phase data synthesis circuit 127' synthesizes the phase data (2) for performing fixed correction and the phase data (1) for performing arbitrary correction, and the phase data decode circuit 125 converts the phase data obtained by the synthesizing. Accordingly, it becomes possible to correct both a fixed scanning irregularity, such as a scanning irregularity originating from a characteristic of a scanning lens, and a varying scanning irregularity varying for each line, such as a rotation irregularity of the polygon mirror newly supplied from the dot displacement detection/control part 110 as phase data (1). Further, the phase data corresponding to the phase shift amounts can be assigned arbitrarily outside; thus, it becomes possible to apply phase data easy to be processed for an external control device and so forth.

EMBODIMENT 7

Figure 13:
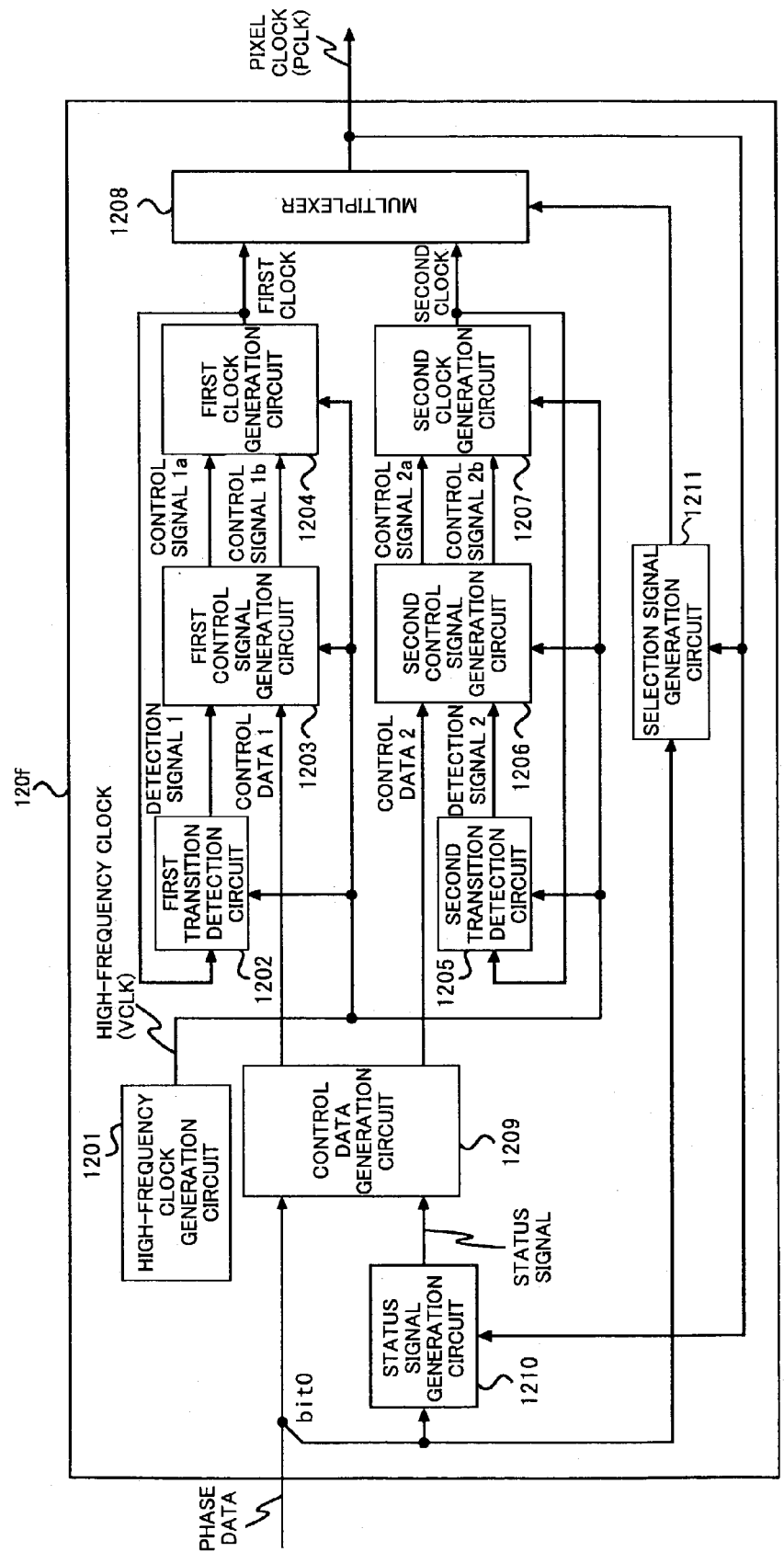
FIG. 13 is a block diagram showing a structure of a pixel clock generation part according to a seventh embodiment of the present invention.

Next, a description will be given of still another structure of the pixel clock generation part 120 included in the above-described image forming device 100 as a seventh embodiment according to the present invention. FIG. 13 is a block diagram showing the structure of a pixel clock generation part 120f according to the present seventh embodiment.

As shown in FIG. 13, the pixel clock generation part 120f comprises a high-frequency clock generation circuit 1201, a first transition detection circuit 1202, a first control signal generation circuit 1203, a first clock generation circuit 1204, a second transition detection circuit 1205, a second control signal generation circuit 1206, a second clock generation circuit 1207, a multiplexer 1208, a control data generation circuit 1209, a status signal generation circuit 1210, and a selection signal generation circuit 1211. Besides, the first transition detection circuit 1202, the first control signal generation circuit 1203, the first clock generation circuit 1204, the second transition detection circuit 1205, the second control signal generation circuit 1206, the second clock generation circuit 1207 and the control data generation circuit 1209 together form a clock generation part generating a plurality of clocks (first and second clocks) having different phases and/or periods. Further, the first clock generation circuit 1204 and the second clock generation circuit 1207 form a state transition part causing states of the clocks to transit The multiplexer 1208 and the selection signal generation circuit 1211 form a clock selecting part selecting either of the clocks.

In the above-described structure, the high-frequency clock generation circuit 1201 generates a high-frequency clock (VCLK) which is a reference signal for the pixel clock (PCLK), and supplies this high-frequency clock (VCLK) to the first transition detection circuit 1202, the second transition detection circuit 1205, the first control signal generation circuit 1203, the second control signal generation circuit 1206, the first clock generation circuit 1204 and the second clock generation circuit 1207.

The first transition detection circuit 1202 operates upon rising of the high-frequency clock (VCLK), and detects a rise of a first clock signal fed back from the first clock generation circuit 1204, and outputs a pulse signal having a width of one clock of the high-frequency clock (VCLK) as a detection signal 1.

The first control signal generation circuit 1203 operates upon rising of the high-frequency clock (VCLK), and outputs a control signal 1a and a control signal 1b, based on the detection signal 1 supplied from the first transition detection circuit 1202 and control data 1 supplied from the control data generation circuit 1209 (hereinafter described).

The first clock generation circuit 1204 operates upon rising of the high-frequency clock (VCLK), and generates the first clock based on the control signal 1a and the control signal 1b supplied from the first control signal generation circuit 1203.

The second transition detection circuit 1205 operates upon falling of the high-frequency clock (VCLK), and detects a rise of a second clock signal fed back from the second clock generation circuit 1207, and outputs a pulse signal having the width of one clock of the high-frequency clock (VCLK) as a detection signal 2.

The second control signal generation circuit 1206 operates upon falling of the high-frequency clock (VCLK), and outputs a control signal 2a and a control signal 2b, based on the detection signal 2 supplied from the second transition detection circuit 1205 and control data 2 supplied from the control data generation circuit 1209.

The second clock generation circuit 1207 operates upon falling of the high-frequency clock (VCLK), and generates the second clock based on the control signal 2a and the control signal 2b supplied from the second control signal generation circuit 1206.

Based on a selection signal supplied from the selection signal generation circuit 1211 (hereinafter described), the multiplexer 1208 selects either of the first clock and the second clock supplied thereto, and outputs the selected clock as the pixel clock (PCLK).

Based on the phase data supplied from the dot displacement detection/control part 110 shown in FIG. 2 and a status signal supplied from the status signal generation circuit 1210 (hereinafter described), the control data generation circuit 1209 generates the control data 1 and the control data 2, and outputs the control data 1 and the control data 2 to the first control signal generation circuit 1203 and the second control signal generation circuit 1206, respectively.

In the present seventh embodiment, the phase data is 3-bit data, for example, and the phase shift amounts and the phase data have correspondences as shown in Table 5 below.

TABLE 5

| Phase shift amount | Phase data (3-bit) |
|---|---|
| 0 (no phase shift) | 000 |
| Advance 1/16 PCLK | 001 |
| Advance 2/16 PCLK | 010 |
| Advance 3/16 PCLK | 011 |
| Delay 1/16 PCLK | 111 |
| Delay 2/16 PCLK | 110 |
| Delay 3/16 PCLK | 101 |

When a bit 0 of the phase data is '1', the status signal generation circuit 1210 toggles a signal at a timing of rising of the pixel clock (PCLK), and outputs the toggled signal as the status signal. Besides, the bit 0 represents a tail-end bit in a bit arrangement of the phase data (for example, the bit 0 represents '1' in the phase data '001').

Accordingly, when the pixel clock (PCLK) has risen upon rising of the high-frequency clock (VCLK), the status signal indicates a first state ('0'); when the pixel clock (PCLK) has fallen upon falling of the high-frequency clock (VCLK), the status signal indicates a second state ('1').

When the bit 0 of the phase data is '1', the selection signal generation circuit 1211 toggles a signal at a timing of falling of the pixel clock (PCLK), and outputs the toggled signal as the selection signal.

First and Second Control Signal Generation Circuits 1203 and 1206

Figure 14:
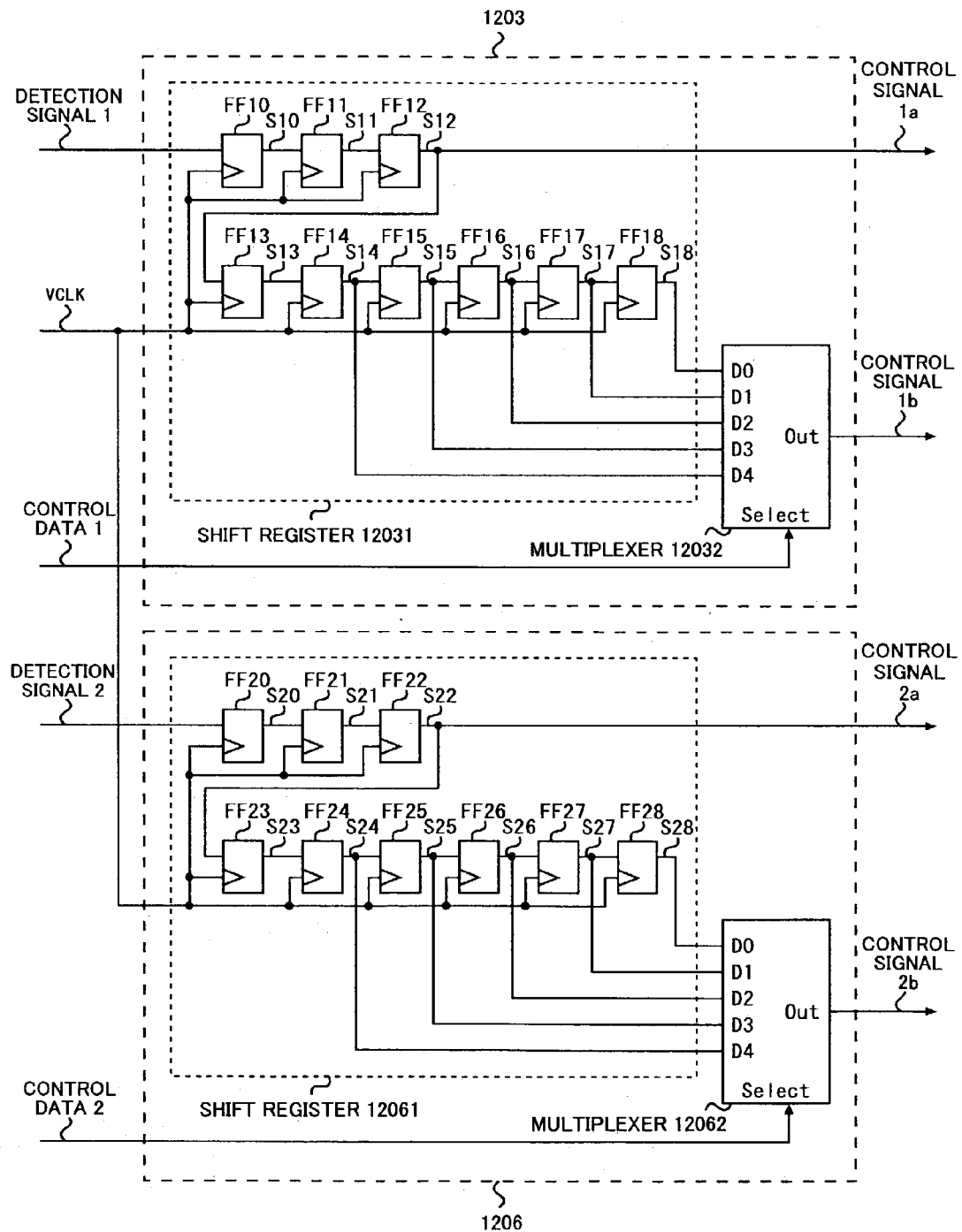
FIG. 14 is a circuit diagram showing structures of a first control signal generation circuit and a second control signal generation circuit shown in FIG. 13.

Here, a description will be given, with reference to FIG. 14, of circuit structures of the first control signal generation circuit 1203 and the second control signal generation circuit 1206 shown in FIG. 13. As shown in FIG. 14, the first control signal generation circuit 1203 comprises a shift register 12031 and a multiplexer 12032. The shift register 12031 is composed of a plurality of steps of flip-flops (FFs; nine steps of FF10–FF18 in FIG. 14 for example). The multiplexer 12032 selectively outputs either of signals output from the FFs composing the shift register 12031. Similarly, the second control signal generation circuit 1206 comprises a shift register 12061 and a multiplexer 12062. The shift register 12061 is composed of a plurality of steps of flip-flops (FFs; nine steps of FF20–FF28 in FIG. 14 for example). The multiplexer 12062 selectively outputs either of signals output from the FFs composing the shift register 12061. Besides, when no phase shift exists, the shift registers 12031 and 12061 shown in FIG. 14 generate the pixel clock (PCLK) with a duty ratio of 50% which is equivalent to an eight-divided frequency of the high-frequency clock (VCLK).

In this structure, the shift register 12031 operates upon rising of the high-frequency clock (VCLK), and the shift register 12061 operates upon falling of the high-frequency clock (VCLK).

The shift register 12031 shifts a phase of the supplied detection signal 1 according to the high-frequency clock (VCLK). Since the shift registers 12031 generates the pixel clock (PCLK) with the duty ratio of 50% when no phase shift exists, the shift register 12031 outputs a signal S12 output from a third step of FF12 as the control signal 1a. Similarly, the shift register 12061 shifts a phase of the supplied detection signal 2 according to the high-frequency clock (VCLK), and outputs a signal S22 output from a third step of FF22 as the control signal 2a.

The multiplexer 12032 is supplied with outputs (signals S14–S18) of FF14–FF18 composing the shift register 12031. The multiplexer 12032 selects either of the supplied signals S14–S18 according to the control data 1, and outputs the selected signal as the control signal 1b. Similarly, the multiplexer 12062 is supplied with outputs (signals S24–S28) of FF24–FF28 composing the shift register 12061. The multiplexer 12062 selects either of the supplied signals S24–S28 according to the control data 2, and outputs the selected signal as the control signal 2b. Table 6 below is a truth table showing relationships between the control data 1 or the control data 2 and the control signal 1b or the control signal 2b in this structure.

TABLE 6

| Control data 1 or 2 | Control signal 1b | Control signal 2b |
|---|---|---|
| 000 | S18 | S28 |
| 001 | S17 | S27 |
| 010 | S16 | S26 |
| 011 | S15 | S25 |
| 100 | S14 | S24 |

First and Second Clock Generation Circuits 1204 and 1207

Figure 15:
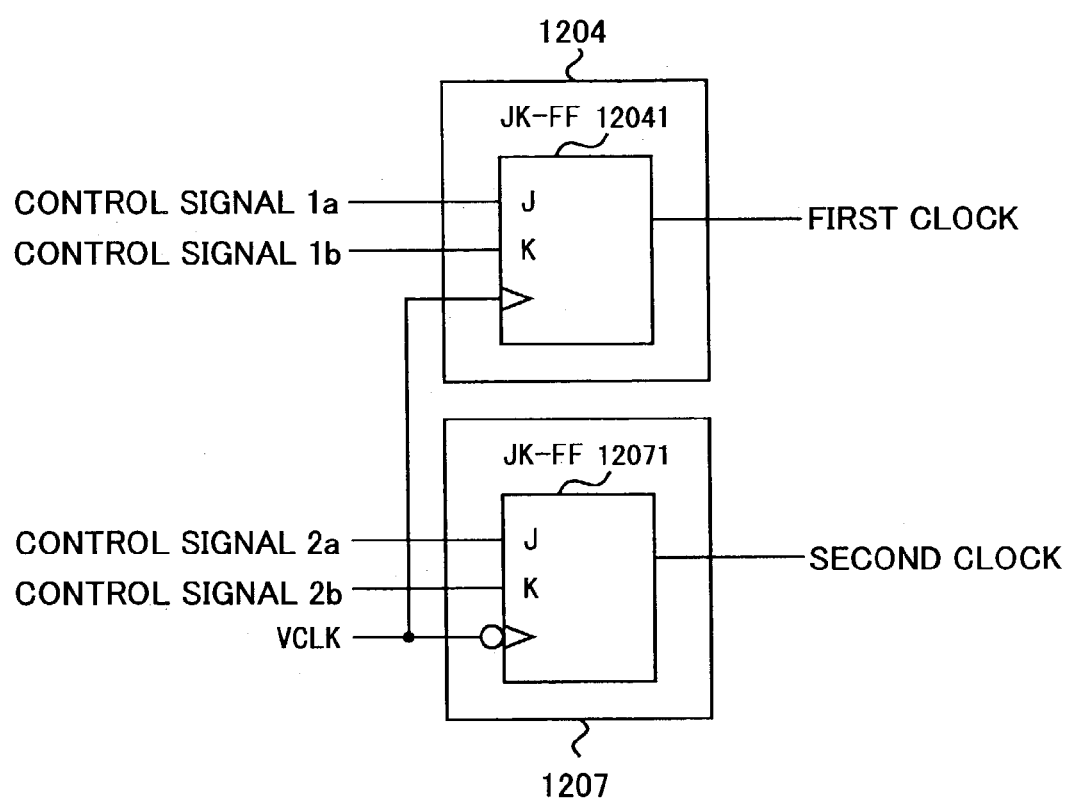
FIG. 15 is a circuit diagram showing structures of a first clock generation circuit and a second clock generation circuit shown in FIG. 13.

Besides, a description will be given, with reference to FIG. 15, of circuit structures of the first clock generation circuit 1204 and the second clock generation circuit 1207 shown in FIG. 13. As shown in FIG. 15, the first clock generation circuit 1204 comprises a JK-FF 12041, and the second clock generation circuit 1207 comprises a JK-FF 12071. In these structures, the JK-FF 12041 operates upon rising of the high-frequency clock (VCLK), and the JK-FF 12071 operates upon falling of the high-frequency clock (VCLK).

Accordingly, when the control signal 1a is 'H', and the control signal 1b is 'L', the first clock generation circuit 1204 outputs 'L' as the first clock upon rising of the high-frequency clock (VCLK). On the other hand, when the control signal 1a is 'L', and the control signal 1b is 'H', the first clock generation circuit 1204 outputs 'H' as the first clock upon rising of the high-frequency clock (VCLK). Similarly, when the control signal 2a is 'H', and the control signal 2b is 'L', the second clock generation circuit 1207 outputs 'L' as the second clock upon falling of the high-frequency clock (VCLK). On the other hand, when the control signal 2a is 'L', and the control signal 2b is 'H', the second clock generation circuit 1207 outputs 'H' as the second clock upon falling of the high-frequency clock (VCLK).

Figure 16:
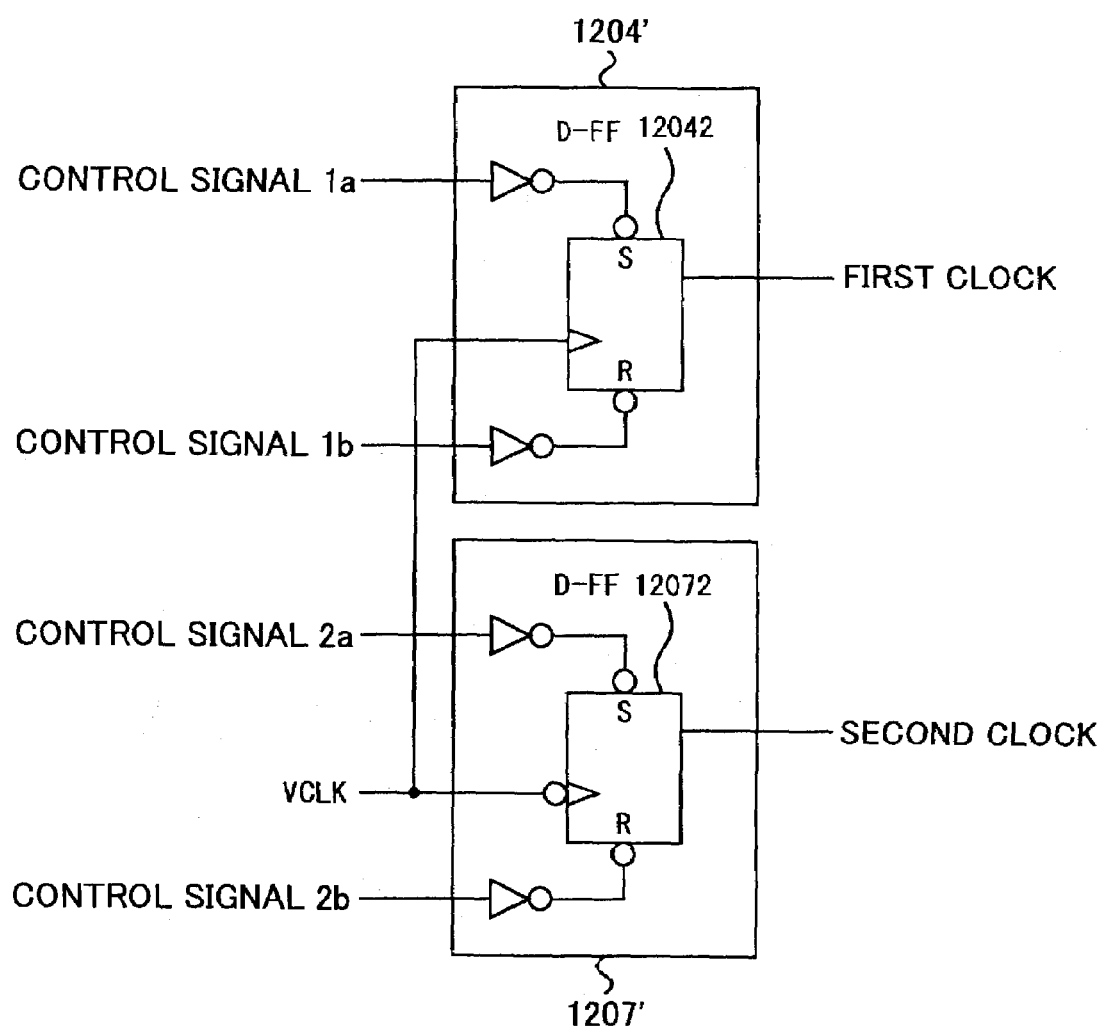
FIG. 16 is a circuit diagram showing other structures of the first clock generation circuit and the second clock generation circuit shown in FIG. 13.

Additionally, a description will be given, with reference to FIG. 16, of an example of other circuit structures of the first clock generation circuit 1204 and the second clock generation circuit 1207 as a first clock generation circuit 1204' and a second clock generation circuit 1207'. As shown in FIG. 16, in this example, the first clock generation circuit 1204' comprises a D-type flip-flop (D-FF) 12042 with a clock-synchronous set/reset function, and the second clock generation circuit 1207' comprises a D-type flip-flop (D-FF) 12072 with a clock-synchronous set/reset function. The first clock generation circuit 1204' and the second clock generation circuit 1207' in this example operate in the same manners as the first clock generation circuit 1204 and the second clock generation circuit 1207 shown in FIG. 15.

Control Data Generation Circuit 1209

Next, a description will be give of the control data generation circuit 1209 shown in FIG. 13. The control data generation circuit 1209 decodes the phase data supplied from the dot displacement detection/control part 110 shown in FIG. 2 and the status signal supplied from the status signal generation circuit 1210 so as to generate the control data 1 and the control data 2, and outputs the control data 1 and the control data 2. An operation of this control data generation circuit 1209 relates to the first control signal generation circuit 1203 and the second control signal generation circuit 1206. That is, the operation of decoding by the control data generation circuit 1209 is determined depending on an order of inputs from the shift register 12031 of the first control signal generation circuit 1203 and an order of inputs from the shift register 12061 of the second control signal generation circuit 1206 shown in FIG. 14. Besides, in the present seventh embodiment, the phase shift amounts and the phase data have the correspondences as shown in Table 5 above. Also, Table 7 below is a truth table of the control data generation circuit 1209 according to the present seventh embodiment.

TABLE 7

| Phase data (3-bit) | Status signal | Control data 1 | Control data 2 |
|---|---|---|---|
| 000 | 0 | 010 | 010 |
| 000 | 1 | 010 | 010 |
| 001 | 0 | 010 | 001 |
| 001 | 1 | 001 | 010 |
| 010 | 0 | 001 | 001 |
| 010 | 1 | 001 | 001 |
| 011 | 0 | 001 | 000 |
| 011 | 1 | 000 | 001 |
| 111 | 0 | 011 | 010 |
| 111 | 1 | 010 | 011 |
| 110 | 0 | 011 | 011 |
| 110 | 1 | 011 | 011 |
| 101 | 0 | 100 | 011 |
| 101 | 1 | 011 | 100 |

OPERATION OF EMBODIMENT 7

Figure 17:
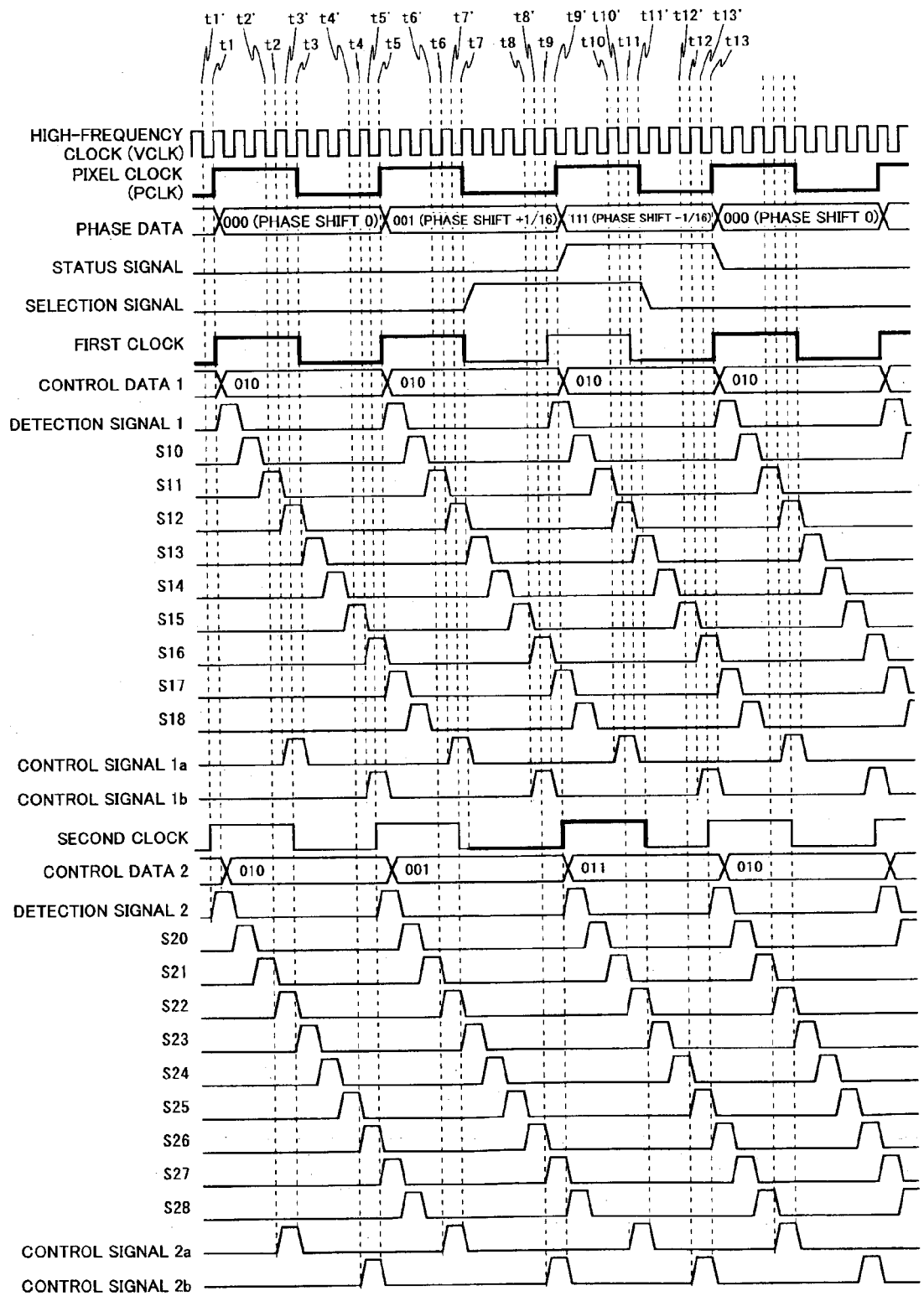
FIG. 17 is a timing chart showing operations of the pixel clock generation part shown in FIG. 13.

Next, a description will be given, with reference to a timing chart of FIG. 17, of operations of the pixel clock generation part 120f. FIG. 17 shows examples of cases where the phase shift amount is '0' (hereinafter referred to as "phase shift 0"), the phase shift amount is '+½' the width of the high-frequency clock (VCLK) (equivalent to advancing 1/16 the width of the pixel clock (PCLK) undergoing no phase shift: hereinafter referred to as "phase shift +1/16"), and the phase shift amount is '−½' the width of the high-frequency clock (VCLK) (equivalent to delaying 1/16 the width of the pixel clock (PCLK) undergoing no phase shift: hereinafter referred to as "phase shift −1/16").

Phase Shift 0

First, a description will be given, with reference to timings t1'–t5 shown in FIG. 17, of generations of the control data 1 and the control data 2, a generation of the first clock, a generation of the second clock, and a generation of the pixel clock (PCLK), upon generating the pixel clock (PCLK) with the phase shift amount being '0'.

Generation of Control Data 1 and 2

In this operation, the phase data '000' indicating the phase shift 0 is supplied from the dot displacement detection/control part 110 to the pixel-clock generation part 120f in synchronization with a rise of the pixel clock (PCLK) (at a timing t1). The supplied phase data '000' is input to the control data generation circuit 1209. In this course, the bit 0 of the phase data is supplied to the status signal generation circuit 1210 and the selection signal generation circuit 1211 (at the timing t1). Besides, the status signal is '0' in an initial state. Therefore, in this case, the state of the status signal supplied to the control data generation circuit 1209 is '0'.

Thus, when the phase data '000' and the status signal '0' are supplied, the control data generation circuit 1209 generates the control data 1 '010' and the control data 2 '010' according to the truth table shown in Table 7, and outputs the control data 1 and the control data 2 to the first control signal generation circuit 1203 and the second control signal generation circuit 1206, respectively.

Generation of First Clock

At the timing t1, the first transition detection circuit 1202 detects a rise of the first clock, and outputs the pulse signal having the width of one clock of the high-frequency clock (VCLK) as the detection signal 1 (at the timing t1), as shown in FIG. 17. The detection signal 1 is supplied to the shift register 12031 of the first control signal generation circuit 1203. The shift register 12031 generates the signals S10–S18 as shown in FIG. 17 by shifting the detection signal 1. Besides, as mentioned above, the shift register 12031 outputs the signal S12 among the generated signals as the control signal 1a.

Thus, since the control signal 1a is the signal S12, the control signal 1a starts to rise to 'H' at a timing t2, and maintains the state of 'H' at a timing t3. Accordingly, the first clock generation circuit 1204 causes the state of the output first clock to transit from 'H' to 'L' at the timing t3.

Besides, since the control data 1 '010' is supplied to the multiplexer 12032 of the first control signal generation circuit 1203, the signal S16 from the shift register 12031 is selected and is output as the control signal 1b. Thus, since the control signal 1b is the signal S16, the control signal 1b starts to rise to 'H' at a timing t4, and maintains the state of 'H' at a timing t5. Accordingly, the first clock generation circuit 1204 causes the state of the output first clock to transit from 'L' to 'H' at the timing t5.

Thus, causing the state of the first clock to transit according to the control signal 1a and the control signal 1b generates the first clock that assumes the state of '1' in a period from the timing t1 to the timing t3, and assumes the state of '0' in a period from the timing t3 to the timing t5.

Generation of Second Clock

At a timing t1', the second transition detection circuit 1205 detects a rise of the second clock, and outputs the pulse signal having the width of one clock of the high-frequency clock (VCLK) as the detection signal 2 (at the timing t1'), as shown in FIG. 17. The detection signal 2 is supplied to the shift register 12061 of the second control signal generation circuit 1206. The shift register 12061 generates the signals S20–S28 as shown in FIG. 17 by shifting the detection signal 2. Besides, as mentioned above, the shift register 12061 outputs the signal S22 among the generated signals as the control signal 2a.

Thus, since the control signal 2a is the signal S22, the control signal 2a starts to rise to 'H' at a timing t2', and maintains the state of 'H' at a timing t3'. Accordingly, the second clock generation circuit 1207 causes the state of the output second clock to transit from 'H' to 'L' at the timing t3'.

Besides, since the control data 2 '010' is supplied to the multiplexer 12062 of the second control signal generation circuit 1206, the signal S26 from the shift register 12061 is selected and is output as the control signal 2b. Thus, since the control signal 2b is the signal S26, the control signal 2b starts to rise to 'H' at a timing t4', and maintains the state of 'H' at a timing t5'. Accordingly, the second clock generation circuit 1207 causes the state of the output second clock to transit from 'L' to 'H' at the timing t5'.

Thus, causing the state of the second clock to transit according to the control signal 2a and the control signal 2b generates the second clock that assumes the state of '1' in a period from the timing t1' to the timing t3', and assumes the state of '0' in a period from the timing t3' to the timing t5'.

Generation of Pixel Clock (PCLK)

Further, since the bit 0 of the phase data supplied to the selection signal generation circuit 1211 is '0', the selection signal remains 'L'. Accordingly, the multiplexer 1208 selects the first clock from among the first clock and the second clock supplied thereto, and outputs the selected first clock as the pixel clock (PCLK).

According to the heretofore-described operations, the pixel clock (PCLK) with the phase shift 0 is generated and output.

Phase Shift +1/16

Next, a description will be given, with reference to timings t5'–t9' shown in FIG. 17, of generations of the control data 1 and the control data 2, a generation of the first clock, a generation of the second clock, and a generation of the pixel clock (PCLK), upon generating the pixel clock (PCLK) with the phase shift amount being longer by 1/16 the width of the pixel clock (PCLK) undergoing no phase shift.

Generation of Control Data 1 and 2

In this operation, the phase data '001' indicating the phase shift +1/16 is supplied from the dot displacement detection/control part 110 to the pixel clock generation part 120f in synchronization with the rise of the pixel clock (PCLK) (at the timing t5). The supplied phase data '001' is input to the control data generation circuit 1209. In this course, although the bit 0 of the phase data is '1', the status signal is not toggled until a next rise of the pixel clock (PCLK), and the status signal remains '0'.

Thus, when the phase data '001' and the status signal '0' are supplied, the control data generation circuit 1209 generates the control data 1 '010' and the control data 2 '001' according to the truth table shown in Table 7, and outputs the control data 1 and the control data 2 to the first control signal generation circuit 1203 and the second control signal generation circuit 1206, respectively.

Generation of First Clock

At the timing t5, the first transition detection circuit 1202 detects the rise of the first clock, and outputs the pulse signal having the width of one clock of the high-frequency clock (VCLK) as the detection signal 1 (at the timing t5), as shown in FIG. 17. The detection signal 1 is supplied to the shift register 12031 of the first control signal generation circuit 1203. The shift register 12031 generates the signals S10–S18 as shown in FIG. 17 by shifting the detection signal 1. Besides, as mentioned above, the shift register 12031 outputs the signal S12 among the generated signals as the control signal 1a.

Thus, since the control signal 1a is the signal S12, the control signal 1a starts to rise to 'H' at a timing t6, and maintains the state of 'H' at a timing t7. Accordingly, the first clock generation circuit 1204 causes the state of the output first clock to transit from 'H' to 'L' at the timing t7.

Besides, since the control data 1 '010' is supplied to the multiplexer 12032 of the first control signal generation circuit 1203, the signal S16 from the shift register 12031 is selected and is output as the control signal 1b. Thus, since the control signal 1b is the signal S16, the control signal 1b starts to rise to 'H' at a timing t8, and maintains the state of 'H' at a timing t9. Accordingly, the first clock generation circuit 1204 causes the state of the output first clock to transit from 'L' to 'H' at the timing t9.

Thus, causing the state of the first clock to transit according to the control signal 1a and the control signal 1b generates the first clock that assumes the state of '1' in a period from the timing t5 to the timing t7, and assumes the state of '0' in a period from the timing t7 to the timing t9.

Generation of Second Clock

At the timing t5', the second transition detection circuit 1205 detects the rise of the second clock, and outputs the pulse signal having the width of one clock of the high-frequency clock (VCLK) as the detection signal 2 (at the timing t5'), as shown in FIG. 17. The detection signal 2 is supplied to the shift register 12061 of the second control signal generation circuit 1206. The shift register 12061 generates the signals S20–S28 as shown in FIG. 17 by shifting the detection signal 2. Besides, as mentioned above, the shift register 12061 outputs the signal S22 among the generated signals as the control signal 2a.

Thus, since the control signal 2a is the signal S22, the control signal 2a starts to rise to 'H' at a timing t6', and maintains the state of 'H' at a timing t7'. Accordingly, the second clock generation circuit 1207 causes the state of the output second clock to transit from 'H' to 'L' at the timing t7'.

Besides, since the control data 2 '001' is supplied to the multiplexer 12062 of the second control signal generation circuit 1206, the signal S27 from the shift register 12061 is selected and is output as the control signal 2b. Thus, since the control signal 2b is the signal S27, the control signal 2b starts to rise to 'H' at a timing t8', and maintains the state of 'H' at a timing t9'. Accordingly, the second clock generation circuit 1207 causes the state of the output second clock to transit from 'L' to 'H' at the timing t9'.

Thus, causing the state of the second clock to transit according to the control signal 2a and the control signal 2b generates the second clock that assumes the state of '1' in a period from the timing t5' to the timing t7', and assumes the state of '0' in a period from the timing t7' to the timing t9'.

Generation of Pixel Clock (PCLK)

In the present case of the phase shift +1/16, since the bit 0 of the phase data supplied to the selection signal generation circuit 1211 is '1', the selection signal is toggled upon the fall of the pixel clock (PCLK) at the timing t7 so as to become '1'. Accordingly, the first clock is selected and output by the multiplexer 1208 as the pixel clock (PCLK) in a first period of the pixel clock (PCLK) (during which the selection signal is '0'), and the second clock is selected and output by the multiplexer 1208 as the pixel clock (PCLK) in a second period of the pixel clock (PCLK) (during which the selection signal is '1').

According to the heretofore-described operations, the pixel clock (PCLK) with the phase shift +1/16 is generated and output.

Phase Shift −1/16

Next, a description will be given, with reference to timings t9–t13 shown in FIG. 17, of generations of the control data 1 and the control data 2, a generation of the first clock, a generation of the second clock, and a generation of the pixel clock (PCLK), upon generating the pixel clock (PCLK) with the phase shift amount being shorter by 1/16 the width of the pixel clock (PCLK) undergoing no phase shift.

Generation of Control Data 1 and 2

In this operation, the phase data '111' indicating the phase shift −1/16 is supplied from the dot displacement detection/control part 110 to the pixel clock generation part 120f in synchronization with the rise of the pixel clock (PCLK) (at the timing t9'). The supplied phase data '111' is input to the control data generation circuit 1209. In this course, since the bit 0 of the phase data is '1', the status signal is toggled so as to become '1'.

Thus, when the phase data '111' and the status signal '1' are supplied, the control data generation circuit 1209 generates the control data 1 '010' and the control data 2 '011' according to the truth table shown in Table 7, and outputs the control data 1 and the control data 2 to the first control signal generation circuit 1203 and the second control signal generation circuit 1206, respectively.

Generation of First Clock

At the timing t9, the first transition detection circuit 1202 detects the rise of the first clock, and outputs the pulse signal having the width of one clock of the high-frequency clock (VCLK) as the detection signal 1 (at the timing t9), as shown in FIG. 17. The detection signal 1 is supplied to the shift register 12031 of the first control signal generation circuit 1203. The shift register 12031 generates the signals S10–S18 as shown in FIG. 17 by shifting the detection signal 1. Besides, as mentioned above, the shift register 12031 outputs the signal S12 among the generated signals as the control signal 1a.

Thus, since the control signal 1a is the signal S12, the control signal 1a starts to rise to 'H' at a timing t10, and maintains the state of 'H' at a timing t11. Accordingly, the first clock generation circuit 1204 causes the state of the output first clock to transit from 'H' to 'L' at the timing t11.

Besides, since the control data 1 '010' is supplied to the multiplexer 12032 of the first control signal generation circuit 1203, the signal S16 from the shift register 12031 is selected and is output as the control signal 1b. Thus, since the control signal 1b is the signal S16, the control signal 1b starts to rise to 'H' at a timing t12, and maintains the state of 'H' at a timing t13. Accordingly, the first clock generation circuit 1204 causes the state of the output first clock to transit from 'L' to 'H' at the timing t13.

Thus, causing the state of the first clock to transit according to the control signal 1a and the control signal 1b generates the first clock that assumes the state of '1' in a period from the timing t9 to the timing t11, and assumes the state of '0' in a period from the timing t11 to the timing t13.

Generation of Second Clock

At the timing t9', the second transition detection circuit 1205 detects the rise of the second clock, and outputs the pulse signal having the width of one clock of the high-frequency clock (VCLK) as the detection signal 2 (at the timing t9'), as shown in FIG. 17. The detection signal 2 is supplied to the shift register 12061 of the second control signal generation circuit 1206. The shift register 12061 generates the signals S20–S28 as shown in FIG. 17 by shifting the detection signal 2. Besides, as mentioned above, the shift register 12061 outputs the signal S22 among the generated signals as the control signal 2a.

Thus, since the control signal 2a is the signal S22, the control signal 2a starts to rise to 'H' at a timing t10', and maintains the state of 'H' at a timing t11'. Accordingly, the second clock generation circuit 1207 causes the state of the output second clock to transit from 'H' to 'L' at the timing t11'.

Besides, since the control data 2 '011' is supplied to the multiplexer 12062 of the second control signal generation circuit 1206, the signal S25 from the shift register 12061 is selected and is output as the control signal 2b. Thus, since the control signal 2b is the signal S25, the control signal 2b starts to rise to 'H' at a timing t12', and maintains the state of 'H' at a timing t13'. Accordingly, the second clock generation circuit 1207 causes the state of the output second clock to transit from 'L' to 'H' at the timing t13'.

Thus, causing the state of the second clock to transit according to the control signal 2a and the control signal 2b generates the second clock that assumes the state of '1' in a period from the timing t9' to the timing t11', and assumes the state of '0' in a period from the timing t11' to the timing t13'.

Generation of Pixel Clock (PCLK)

In the present case of the phase shift $-\frac{1}{16}$, since the bit 0 of the phase data supplied to the selection signal generation circuit 1211 is '1', the selection signal is toggled upon the fall of the pixel clock (PCLK) at the timing t11 so as to become '0'. Accordingly, the second clock is selected and output by the multiplexer 1208 as the pixel clock (PCLK) in a first period of the pixel clock (PCLK) (during which the selection signal is '1'), and the first clock is selected and output by the multiplexer 1208 as the pixel clock (PCLK) in a second period of the pixel clock (PCLK) (during which the selection signal is '0').

According to the heretofore-described operations, the pixel clock (PCLK) with the phase shift $-\frac{1}{16}$ is generated and output.

In addition, the description above sets forth the cases where the phase shift amount is '0', the phase shift amount is '$+\frac{1}{16}$' the width of the pixel clock (PCLK) undergoing no phase shift, and the phase shift amount is '$-\frac{1}{16}$' the width of the pixel clock (PCLK) undergoing no phase shift; however, according to the first control signal generation circuit 1203 and the second control signal generation circuit 1206 shown in FIG. 14, the phase shift amount is not limited thereto, and cases of the phase shift amount being '$+\frac{2}{16}$' the width of the pixel clock (PCLK) undergoing no phase shift, being '$+\frac{3}{16}$' the width of the pixel clock (PCLK) undergoing no phase shift, being '$-\frac{2}{16}$' the width of the pixel clock (PCLK) undergoing no phase shift and being '$-\frac{3}{16}$' the width of the pixel clock (PCLK) undergoing no phase shift can be controlled in the same manner as described above.

Further, according to the present embodiment, increasing or decreasing the number of steps of FFs in the shift registers 12031 and 12061 enables the phase control of the pixel clock to be performed with a smaller or larger clock width.

According to the above-described structures and operations of the present seventh embodiment, it becomes possible to generate the pixel clock (PCLK) with the phase being shifted by steps of $\pm\frac{1}{16}$ the width of the pixel clock, i.e., by pitch steps of half the width of the high-frequency clock, on an individual pixel clock (PCLK) basis. Besides, when it is arranged in FIG. 13 that the second transition detection circuit 1205, the second control signal generation circuit 1206 and the second clock generation circuit 1207 is supplied with a clock inverted from the high-frequency clock (VCLK), the second transition detection circuit 1205, the second control signal generation circuit 1206 and the second clock generation circuit 1207 can be composed of the same parts as the first transition detection circuit 1202, the first control signal generation circuit 1203 and the first clock generation circuit 1204, thereby reducing costs thereof.

EMBODIMENT 8

Figure 18:
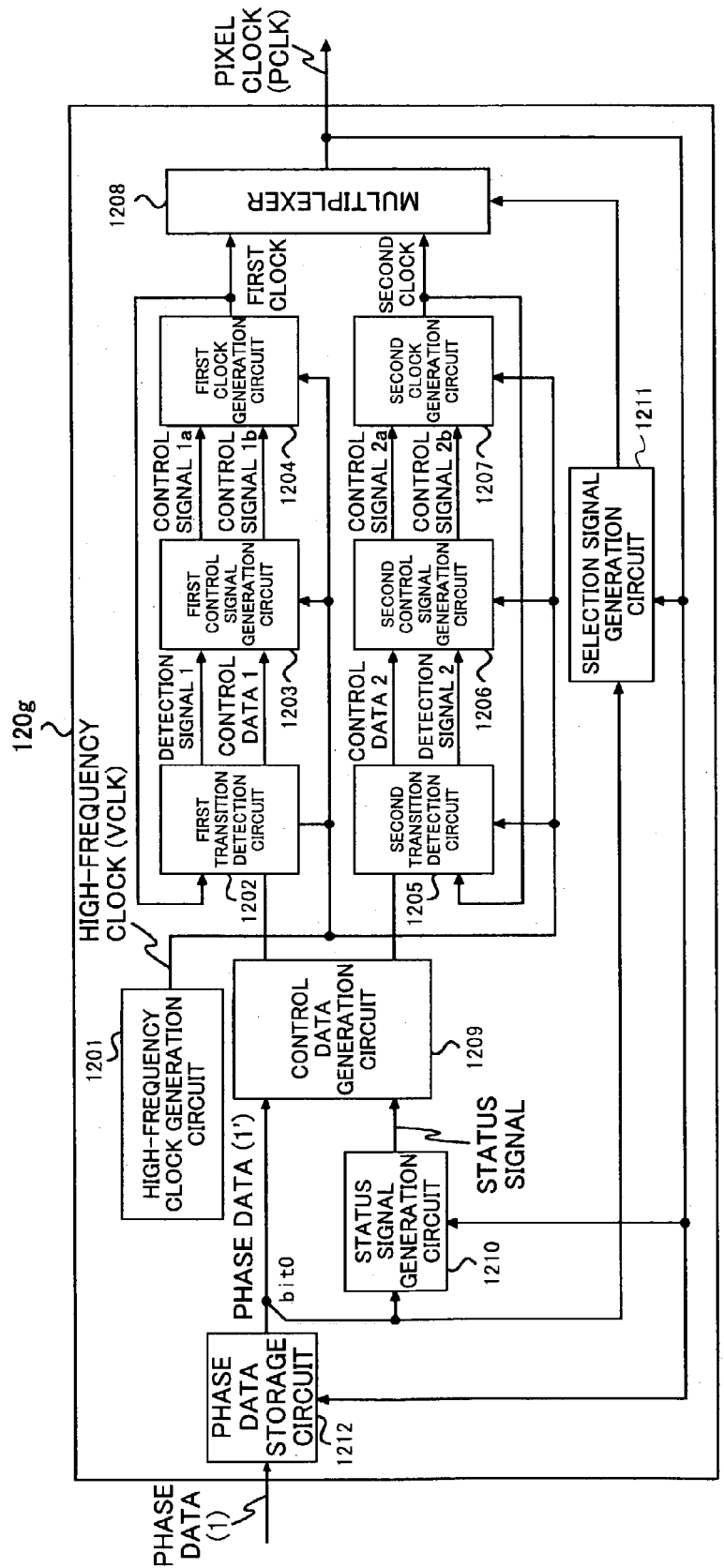
FIG. 18 is a block diagram showing a structure of a pixel clock generation part according to an eighth embodiment of the present invention.

Next, a description will be given of another structure of the pixel clock generation part 120f according to the foregoing seventh embodiment as an eighth embodiment according to the present invention. FIG. 18 is a block diagram showing the structure of a pixel clock generation part 120g according to the present eighth embodiment.

As shown in FIG. 18, the pixel clock generation part 120g further comprises a phase data storage circuit 1212 storing beforehand a plurality of phase data (1') corresponding to a plurality of phase data (1), in addition to the structure of the pixel clock generation part 120f according to the foregoing seventh embodiment. The phase data (1') corresponding to the phase data (1) are preset in the phase data storage circuit 1212 from outside and so forth. Accordingly, upon operation, the phase data storage circuit 1212 reads the phase data one by one in synchronization with the pixel clock (PCLK), and supplies the phase data to the control data generation circuit 1209. Besides, the phase data storage circuit 1212 includes an address counter.

As described above, according to the present eighth embodiment, phase data are stored beforehand in the phase data storage circuit 1212. Accordingly, when using fixed data, the fixed data can be stored beforehand in the phase data storage circuit 1212, thereby alleviating a load imposed on an external control circuit and so forth. Specifically, for example, when correcting a scanning irregularity originating from a characteristic of a scanning lens, phase data becomes equal for each line; thus, phase data for each line may be stored beforehand in the phase data storage circuit 1212. Then, each time a line is scanned, the phase data can be read one by one from a start address of the phase data storage circuit 1212, and be supplied to the control data generation circuit 1209. Therefore, it becomes unnecessary to supply phase data for each line from outside, thereby alleviating a load imposed on an external control circuit and so forth.

Besides, since other structures and operations of the present eighth embodiment are the same as the foregoing seventh embodiment, a description thereof is omitted herein.

EMBODIMENT 9

Figure 19:
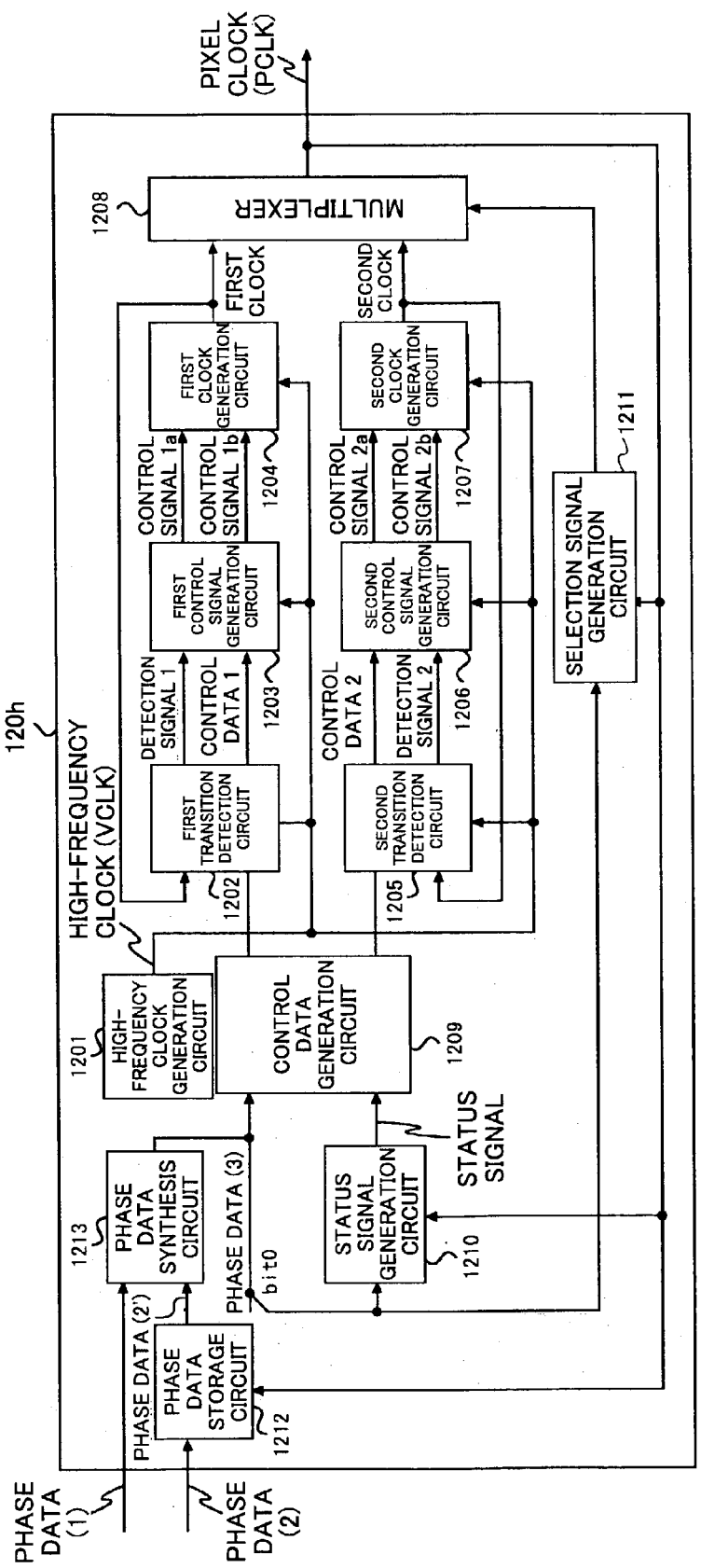
FIG. 19 is a block diagram showing a structure of a pixel clock generation part according to a ninth embodiment of the present invention.

Further, a description will be given of another structure of the pixel clock generation part 120*f* according to the foregoing seventh embodiment as a ninth embodiment according to the present invention. FIG. 19 is a block diagram showing the structure of a pixel clock generation part 120*h* according to the present ninth embodiment.

As shown in FIG. 19, the pixel clock generation part 120*h* further comprises the phase data storage circuit 1212 and a phase data synthesis circuit 1213, in addition to the structure of the pixel clock generation part 120*f* according to the foregoing seventh embodiment. The phase data storage circuit 1212 stores beforehand a plurality of phase data (2') corresponding to a plurality of phase data (2). The phase data synthesis circuit 1213 creates phase data (3) by synthesizing the phase data (2') output from the phase data storage circuit 1212 and phase data (1) directly supplied from outside, and supplies the phase data (3) to the control data generation circuit 1209. That is, the pixel clock generation part 120*h* stores the phase data (2') corresponding to the phase data (2) beforehand by using the phase data storage circuit 1212 of the foregoing eighth embodiment, and synthesizes this phase data (2'), and the phase data (1) supplied from outside for each line, so as to create the phase data (3) used for performing actual correction, by the phase data synthesis circuit 1213. Besides, the phase data (2') corresponding to the phase data (2) are preset in the phase data storage circuit 1212 from outside and so forth.

In the present embodiment, assuming that the phase shift amounts and the phase data have correspondences as shown in Table 5 above, for example, the phase data synthesis circuit 1213 creates the phase data (3) by performing a calculation as an expression 3 shown below. When a result of the synthesis according to the expression 3 cannot be expressed in 3 bits, the phase data synthesis circuit 1213 discards higher-order bits from the result so as to generate the phase data (3) in 3 bits.

Phase data (3)=phase data (1)+phase data (2')  (Expression 3)

As described above, according to the present ninth embodiment, the phase data synthesis circuit 1213 synthesizes the phase data (2') stored beforehand for performing fixed correction and the phase data (1) for performing arbitrary correction. Accordingly, it becomes possible to correct both a fixed scanning irregularity, such as a scanning irregularity originating from a characteristic of a scanning lens, and a varying scanning irregularity varying for each line, such as a rotation irregularity of the polygon mirror newly supplied from the dot displacement detection/control part 110 as phase data (1).

Besides, since other structures and operations of the present ninth embodiment are the same as the foregoing seventh embodiment, a description thereof is omitted herein.

EMBODIMENT 10

In the above-described first to ninth embodiments, the image forming device 100 adopts a single-beam optical system (a single-beam scanning device); besides, the single-beam optical system can be replaced with a multi-beam optical system (a multi-beam scanning device). Hereinafter, a description will be given, with reference to the corresponding drawings, of a case of adopting the multi-beam optical system, as a tenth embodiment according to the present invention.

Multi-Beam Scanning Device 300

Figure 20:
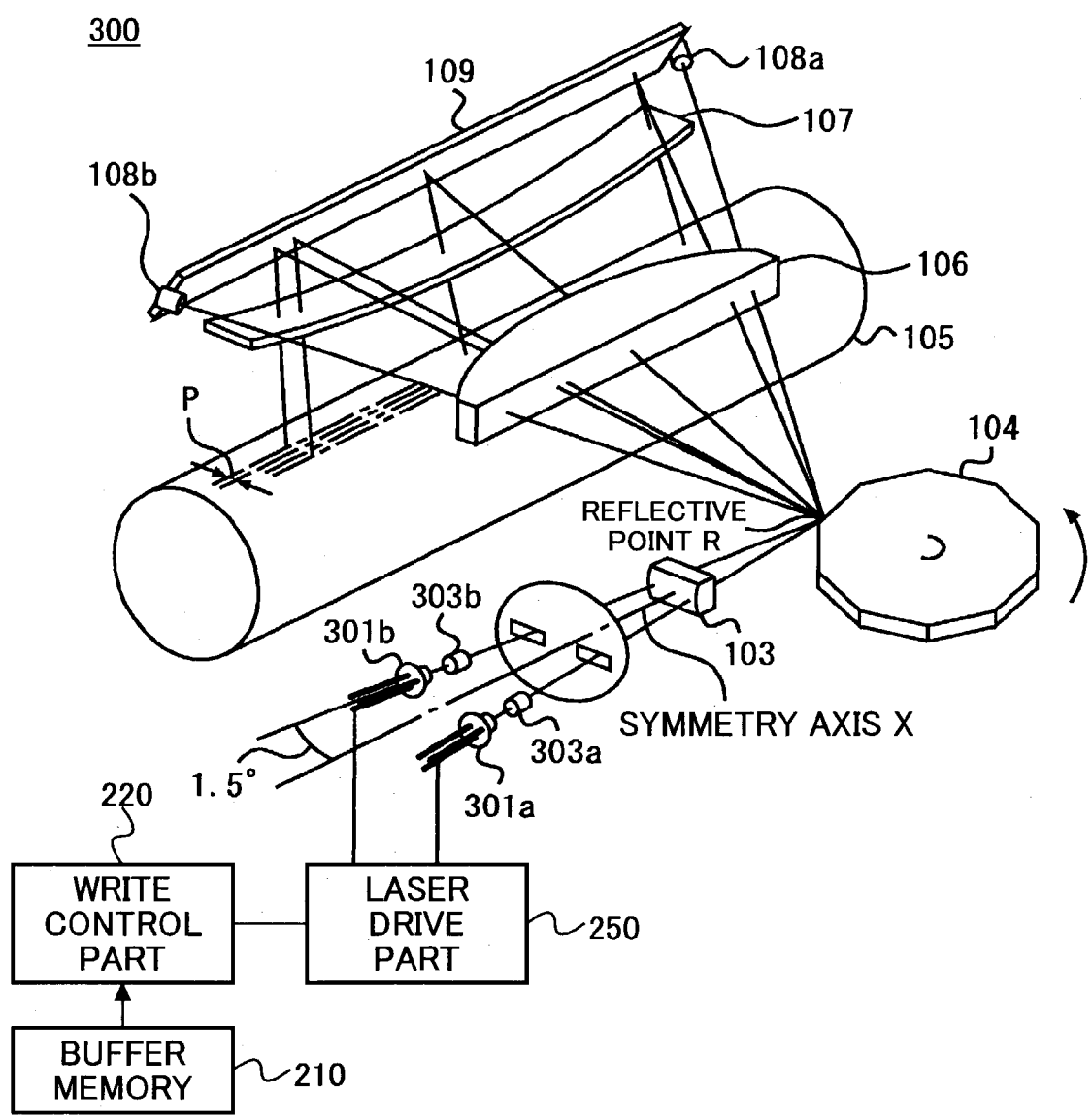
FIG. 20 is a diagram showing a configuration of a multi-beam scanning device according to a tenth embodiment of the present invention.
Figure 21:
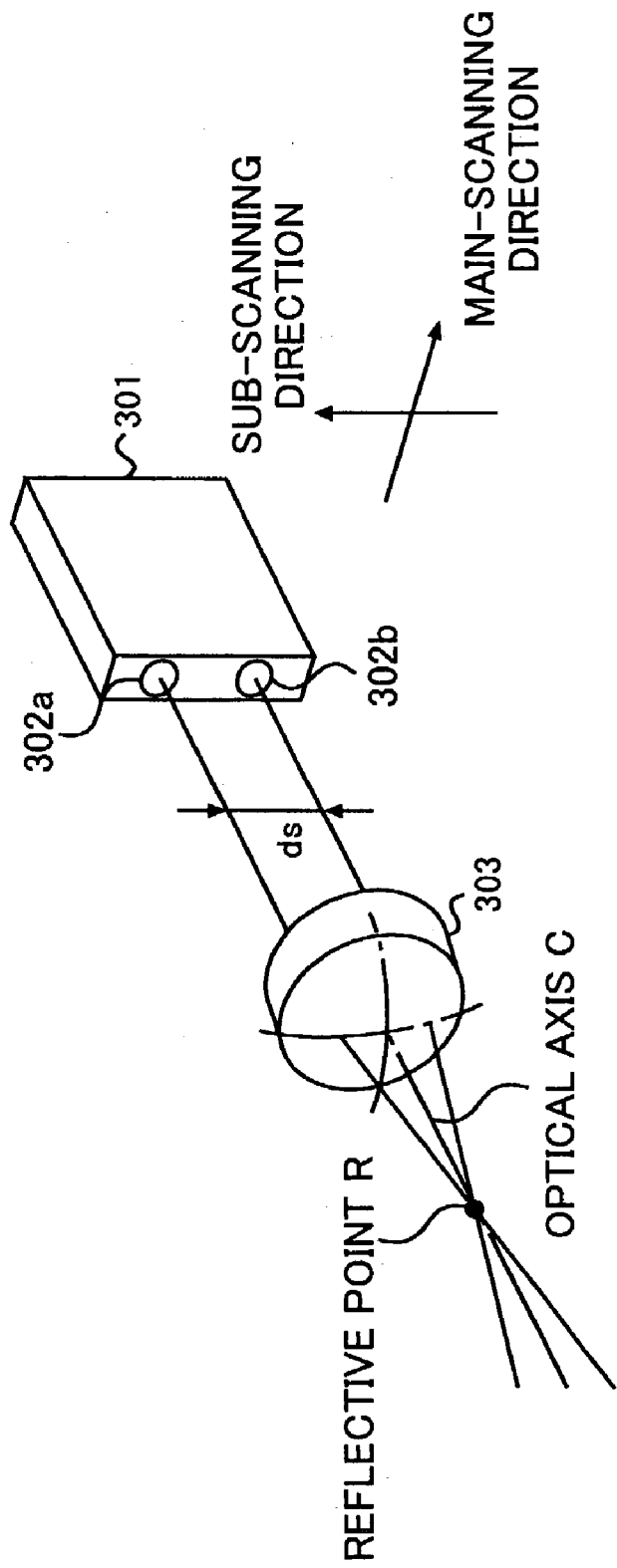
FIG. 21 is a perspective view showing an arrangement of a semiconductor laser array and a collimate lens of the multi-beam scanning device.

FIG. 20 shows a configuration of a multi-beam scanning device 300 of the present tenth embodiment applied to the image forming device 100 of the foregoing embodiments. The multi-beam scanning device 300 shown in FIG. 20 uses a semiconductor laser array 301 (shown in FIG. 21, which corresponds to each of semiconductor laser arrays 301*a* and 301*b* in FIG. 20). As shown in FIG. 21, the semiconductor laser array 301 includes two light-emitting sources 302*a* and 302*b* arranged monolithic, with an interval ds=25 μm therebetween, in a sub-scanning direction symmetrically about an optical axis C of a collimate lens 303 (which corresponds to each of collimate lenses 303*a* and 303*b* in FIG. 20). Optical axes of the two light-emitting sources 302*a* and 302*b* arranged in the sub-scanning direction cross each other at a reflective point R in a deflective plane of the polygon mirror 104 (a deflector) via the collimate lens 303 and the cylinder lens 103. Besides, the cylinder lens 103 is not shown in FIG. 21 so as to simplify the view.

In the multi-beam scanning device 300 using the semiconductor laser array 301, projection axes (optical axes) of the semiconductor laser arrays 301*a* and 301*b* coincide with the respective optical axes of the collimate lenses 303*a* and 303*b*. Additionally, the optical axes of the collimate lenses 303*a* and 303*b* each have a predetermined projection angle (1.5° in FIG. 20) from a symmetry axis X in a main-scanning direction so as to cross each other at the reflective point R of the polygon mirror 104, as mentioned above.

A plurality of beams projected from the semiconductor laser arrays 301*a* and 301*b* are collectively caused to undergo a scanning by the polygon mirror 104 via the cylinder lens 103, and corresponding images are formed on the photo conductor 105 via the f$^\theta$ lens 106 and the toroidal lens 107.

When the multi-beam scanning device 300 is applied to the image forming device 100 according to the foregoing embodiments, print data for one line is stored in a buffer memory 210 (a phase data retaining part) for each of two sets of the light-emitting sources, i.e., a total of four light-emitting sources. A write control part 220 reads the four items of printing data each for one line from the buffer memory 210 for every plane of the polygon mirror 104, and supplies the printing data to a laser drive part 250 so as to drive the semiconductor laser arrays 301*a* and 310*b*. Accordingly, the total of four light-emitting sources of the semiconductor laser arrays 301*a* and 301*b* are driven simultaneously, and four lines of electrostatic latent images are formed on the photo conductor 105 at a time.

When the pixel clock generation part according to the foregoing embodiments does not comprise the phase data storage circuit 126 or 1212, phase data is directly supplied from the dot displacement detection/control part 110 shown in FIG. 2 to the pixel clock generation part. On the other hand, when the pixel clock, generation part comprises the phase data storage circuit 126 or 1212, phase data obtained beforehand is preset in the pixel clock generation part. Besides, the dot displacement detection/control part 110 may generate phase data (2) for performing an equal correction for each line, such as correcting a scanning irregularity originating from a characteristic of a scanning lens, as well as phase data (1) for performing a correction varying for each line, such as correcting a rotation irregularity of the polygon mirror. In this case, when the pixel clock generation part comprises the phase data synthesis circuit 127, 127' or 1213, both the phase data (1) and the phase data (2) may be supplied to the pixel clock generation part, and be synthesized by the phase data synthesis circuit so as to perform both of the above-mentioned corrections. Further, when the multi-beam scanning device 300 of the present tenth embodiment is applied to the image forming device 100 of the foregoing embodiments, providing the photodetectors 108a and 108b for each of the beams projected from the semiconductor laser arrays 301a and 301b enables the dot displacement detection/control part 110 to simultaneously generate phase data for a plurality of lines.

Light Source Unit 400

Figure 22:
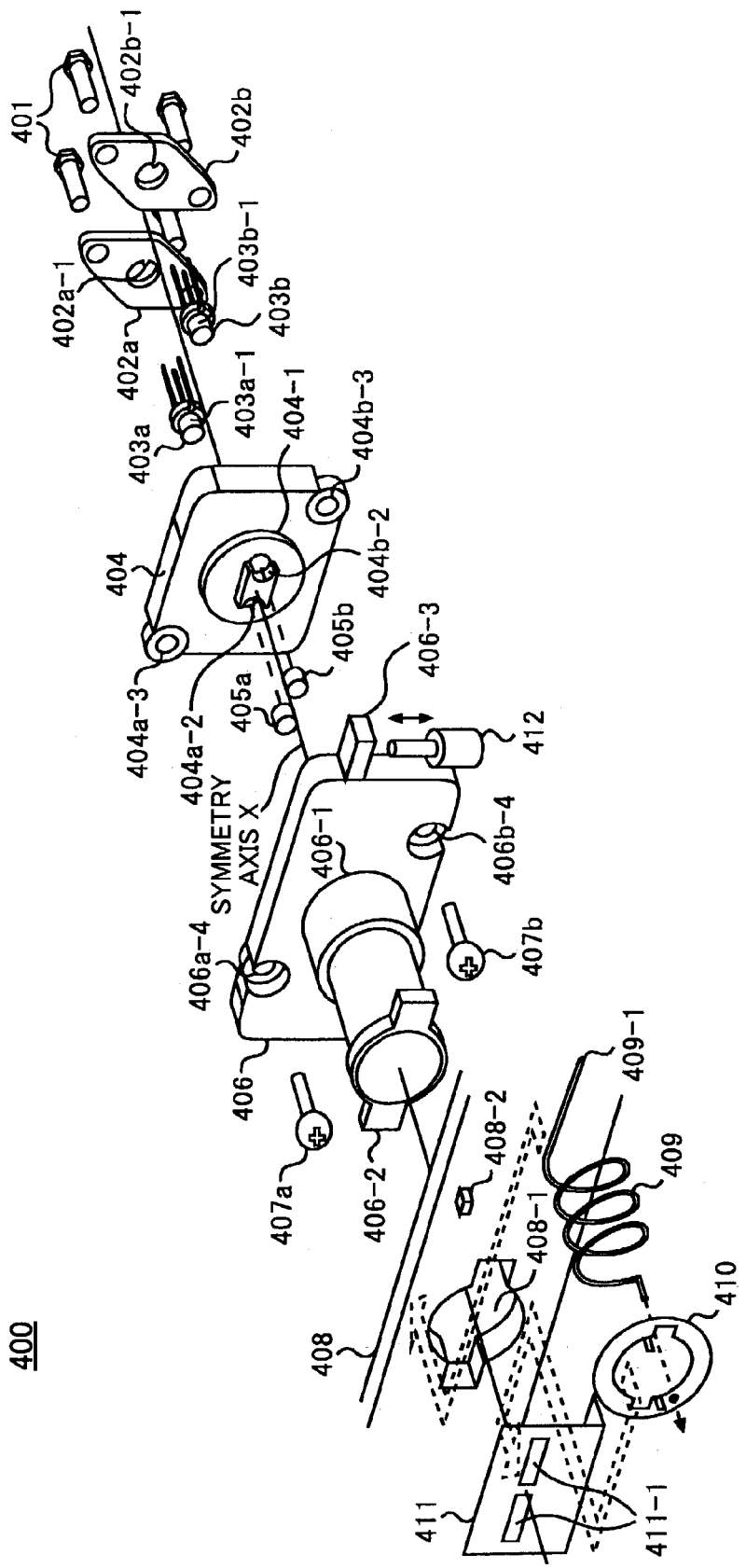
FIG. 22 is an exploded view showing a configuration of a light source unit of the multi-beam scanning device.

Next, a description will be given, with reference to FIG. 22, of a light source unit 400 of the multi-beam scanning device 300. As shown in FIG. 22, semiconductor laser arrays 403a and 403b of the light source unit 400 are inserted into a backside of a base member 404. Specifically, cylindrical heat sink portions 403a-1 and 403b-1 of the semiconductor laser arrays 403a and 403b are inserted into respective insertion holes (not seen in the figure) each of which is formed at the backside of the base member 404 so as to incline slightly at a predetermined angle (approximately 1.5° in the present embodiment) in the main-scanning direction. The inserted semiconductor laser arrays 403a and 403b are pressed against the base member 404 by pressing members 402a and 402b, and are fixed with screws 401. In this course, projections 402a-1 and 402b-1 of the pressing members 402a and 402b are set to notches formed in the cylindrical heat sink portions 403a-1 and 403b-1 so that light-emitting sources of the semiconductor laser arrays 403a and 403b are arranged in a predetermined direction.

Collimate lenses 405a and 405b are positioned by respective perimeters thereof being joined along semicircular mounting guide surfaces 404a-2 and 404b-2 of the base member 404, whereby directions of optical axes of the collimate lenses 405a and 405b are adjusted so that diverging beams projected from the light-emitting sources of the semiconductor laser arrays 403a and 403b become a parallel pencil.

Besides, in the present embodiment, in order to cause the beams from the semiconductor laser arrays 403a and 403b to cross one another in a main-scanning plane as mentioned above, the insertion holes at the backside of the base member 404 and the semicircular mounting guide surfaces 404a-2 and 404b-2 are formed along the beams by being inclined symmetrically at the predetermined angle (1.5° in FIG. 20) from the symmetry axis X.

A cylindrical engagement portion 404-1 of the base member 404 is engaged with a backside of a holder member 406. In this course, screws 407a and 407b are screwed into screw holes 404a-3 and 404b-3 formed in the base member 404 via through holes 406a-4 and 406b-4 formed in the holder member 406 so as to fix the base member 404 and the holder member 406 with each other, thereby forming the light source unit 400.

Figure 26A:
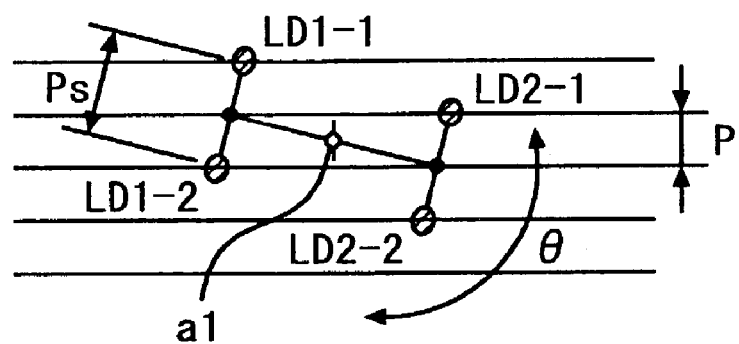
FIG. 26A is a diagram showing beam spot arrays formed on a photo conductor by the light source unit shown in FIG. 22.

A cylinder portion 406-1 of the holder member 406 is inserted into a datum hole 408-1 of a mounting wall 408 of an optical housing, and a stopper member 410 is engaged with an end portion 406-2 of the cylinder portion 406-1 by inserting a spring 409 from a front side of the mounting wall 408. Thereby, the holder member 406 of the light source unit 400 is held fast to a backside of the mounting wall 408. In this course, an end 409-1 of the spring 409 is hooked on a projection 408-2 provided on the mounting wall 408 so as to generate a torque causing rotation around the center of the cylinder portion 406-1 as a rotation axis. (corresponding to the symmetry axis X). Further, a stopper member 406-3 is provided on the holder member 406 for stopping the torque, and an adjusting screw 412 is provided for the stopper member 406-3. Thus, by adjusting the adjusting screw 412, the light source unit 400 as a whole is rotated around the rotation axis so that beam spot arrays derived from the semiconductor laser arrays 403a and 403b are shifted by one line in opposite directions so as to be arranged alternately, as shown in FIG. 26A.

Additionally, an aperture 411 is mounted on the optical housing. This aperture 411 has slits 411-1 corresponding to the semiconductor laser arrays 403a and 403b so as to regulate projection diameters of the beams from the semiconductor laser arrays 403a and 403b.

Next, a description will be given, with reference to FIG. 23, of a configuration of a multi-beam scanning device 800 comprising the above-described light source unit 400 mounted on an optical housing 804.

Figure 23:
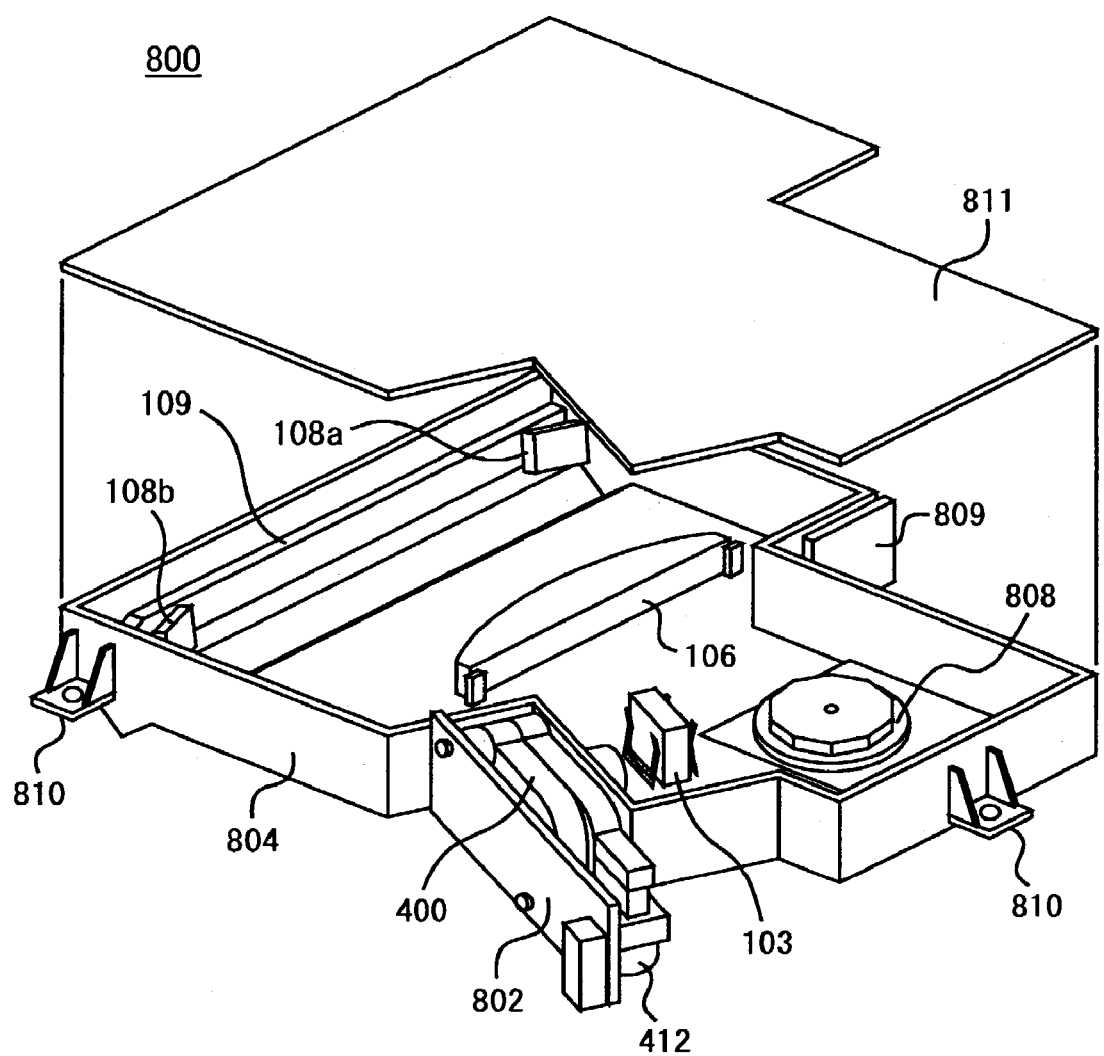
FIG. 23 is a perspective view showing a configuration of a multi-beam scanning device comprising the light source unit mounted on an optical housing.

As shown in FIG. 23, a printed circuit board 802 is mounted on a backside of the light source unit 400. A drive circuit conducting a control of the semiconductor laser arrays 403a and 403b is formed on the printed circuit board 802. The light source unit 400 and the printed circuit board 802 are contacted with the mounting wall 408 of the optical housing 804 by the above-mentioned spring 409, the mounting wall 408 being perpendicular to the optical axis. Additionally, the light source unit 400 is inclined by adjusting the adjusting screw 412 so as to be in position.

The cylinder lens 103, a polygon motor 808 rotating the polygon mirror 104, the f$^\theta$ lens 106 and the mirror 109 are supported in position in the optical housing 804. The photodetectors 108a and 108b detecting the laser light are provided, for example, at both ends of the mirror 109, i.e., at two points of an area that the laser light emitted from the light source unit 400 and deflected by the polygon mirror 104 passes. Thus, the laser light is detected by the photodetectors 108a and 108b so that the first horizontal synchronization signal and the second horizontal synchronization signal are output. A printed circuit board 809 having a synchronization sensor is mounted on a wall of the optical housing 804 from outside, similarly as the light source unit 400 is contacted with the mounting wall 408 of the optical housing 804 from outside. The optical housing 804 is sealed with a cover 811 from above, and is fixed to a predetermined frame member of the image forming device with screws at a plurality of mounting portions 810 projected from walls of the optical housing 804.

Figure 24:
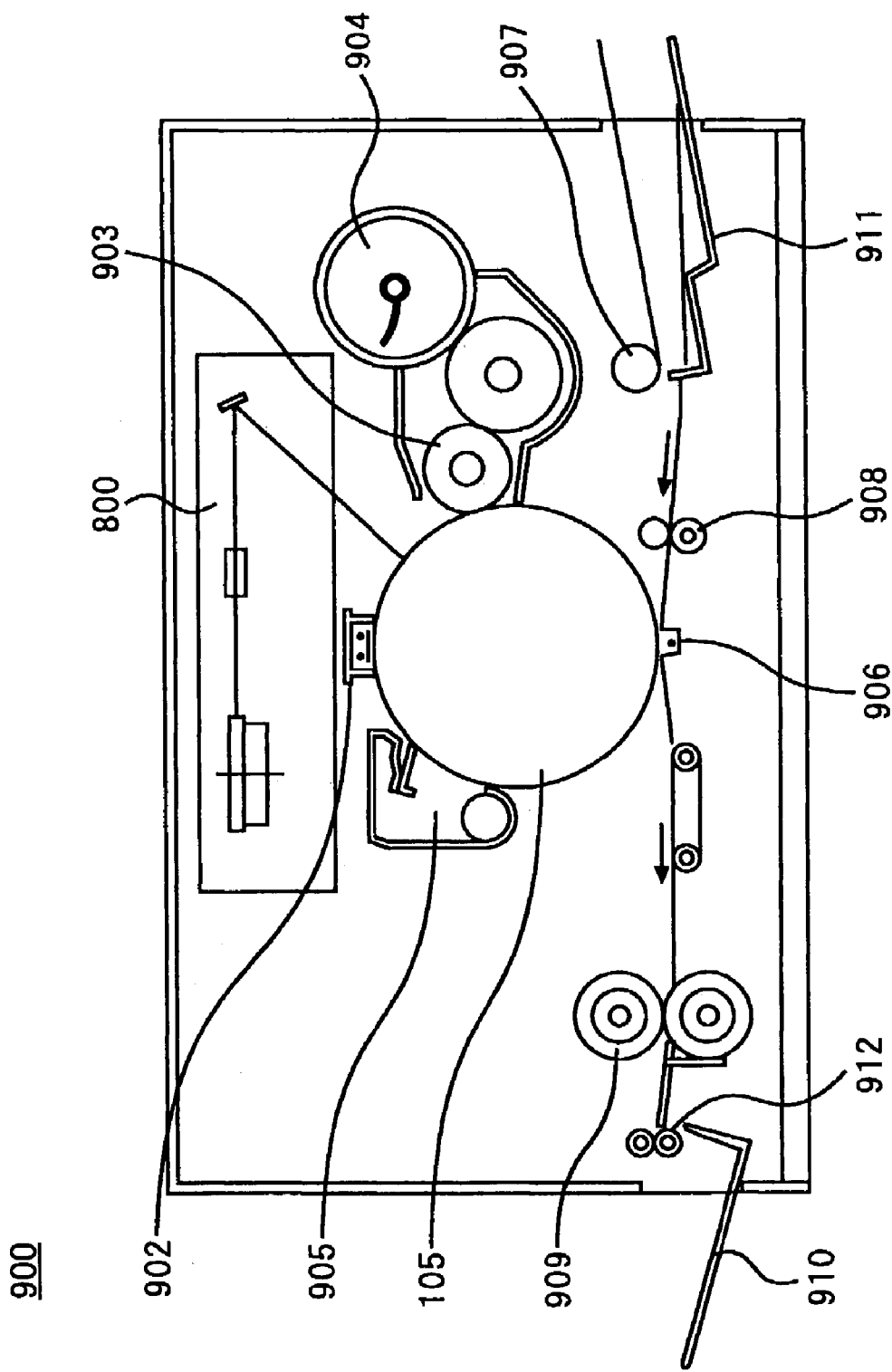
FIG. 24 is a diagram showing a configuration of an image forming device including the multi-beam scanning device.

Further, a description will be given, with reference to FIG. 24, of a configuration of an image forming device 900 including the multi-beam scanning device 800. As shown in FIG. 24, in the image forming device 900, an electrifying charger 902, a developing roller 903, a toner cartridge 904, and a cleaning case 905 around the photo conductor 105 (also referred to as photoconductor drum) which is a scanned surface. The electrifying charger 902 electrifies the photo conductor 105 at high voltage. The developing roller 903 applies an electrified toner to an electrostatic latent image recorded by the multi-beam scanning device 800, thereby developing the electrostatic latent image. The toner cartridge 904 supplies a toner to the developing roller 903. The cleaning case 905 scrapes off and stores a toner remaining on the photoconductor drum 105.

As described above, a plurality of lines of electrostatic latent images are simultaneously recorded on the photo conductor 105 for every plane. A recording sheet is fed from a feeding tray 911 by a feeding roller 907, and is sent out by a pair of register rollers 908 according to a timing of a start of the recording in the sub-scanning direction. Then, upon passing the photoconductor drum 105, the toner is transferred to the recording sheet by a transferring charger 906, and is fixed by fixing rollers 909. Subsequently, the recording sheet is delivered out to a delivery tray 910 by delivering rollers 912.

EMBODIMENT 11

Next, a description will be given of another configuration of the light source unit as an eleventh embodiment according to the present invention.

Figure 25:
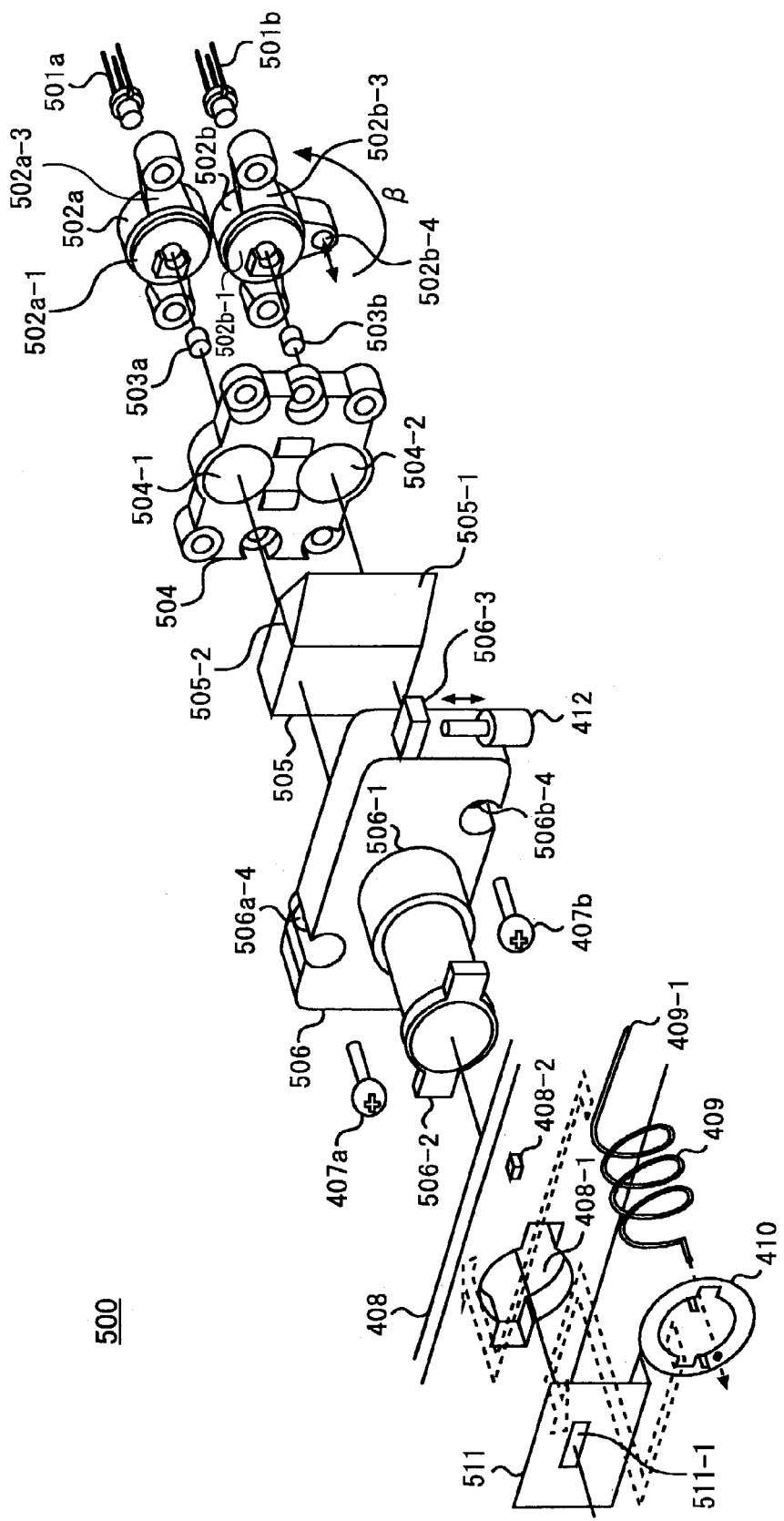
FIG. 25 is an exploded view showing a configuration of a light source unit according to an eleventh embodiment of the present invention.

FIG. 25 is an exploded view showing a configuration of a light source unit 500 according to the present eleventh embodiment. As shown in FIG. 25, the light source unit 500 uses a prism 505 having an inclined plane 505-1 inclined at a predetermined angle from the optical axis so as to compound light beams projected from two semiconductor laser arrays 501a and 501b.

Figure 26B:
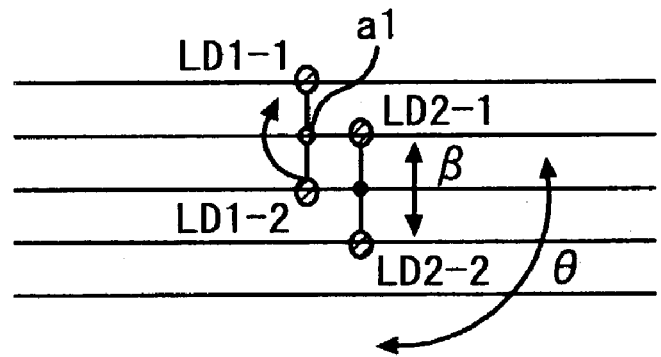
FIG. 26B is a diagram showing beam spot arrays formed on a photo conductor by the light source unit shown in FIG. 25.

In this configuration, the semiconductor laser array 501a and a collimate lens 503a are supported on a first base member 502a, thereby forming a first light source part. The semiconductor laser array 501b and a collimate lens 503b are supported on a second base member 502b, thereby forming a second light source part. The first base member 502a and the second base member 502b are fixed to a common flange member 504 with cylindrical engagement portions 502a-1 and 502b-1 engaged with holes 504-1 and 504-2 formed in the flange member 504, and with screws screwed into screw holes formed in the flange member 504. Additionally, an adjusting screw 502b-4 is screwed in the second base member 502b, and a projecting amount of the adjusting screw 502b-4 is adjusted from backside. Accordingly, both-arm portions 502a-3 and 502b-3 of the base members 502a and 502b are twisted so that only parts supporting the semiconductor laser arrays 501a and 501b and the collimate lenses 503a and 503b are inclined in the sub-scanning direction (indicated by an arrow β in FIG. 25). Thereby, beam spot arrays derived from the semiconductor laser arrays 501a and 501b are shifted by one line in opposite directions so as to be adjusted into an arrangement as shown in FIG. 26B.

The prism 505 composed of a parallelogram prism portion and a triangular prism portion reflects beams of the second light source part on the inclined plane 505-1, and further reflects the beams on a beam splitter plane 505-2 so that the beams are projected close to beams that are directly transmitted from the first light source part. These beams projected close to one another are simultaneously caused to undergo a scanning by the polygon mirror 104 shown for example in FIG. 20, and form respective optical spots on the photo conductor 105.

Additionally, an aperture 511 is mounted on the optical housing, as in the light source unit 400. In the present eleventh embodiment, since the light beams projected from the semiconductor laser arrays 501a and 501b coincide substantially with one another, the aperture 511 has a common slit 511-1.

The flange member 504 is held to a holder member 506 having a similar structure as the holder member 406 in the foregoing light source unit 400. A cylinder portion 506-1 of the holder member 506 is inserted into the datum hole 408-1 of the mounting wall 408 of the optical housing in a similar manner as in the foregoing light source unit 400. Accordingly, in a similar manner as in the foregoing light source unit 400, the light source unit 500 as a whole is rotated so that inclinations of the beam spot arrays derived from the semiconductor laser arrays 501a and 501b are corrected. Besides, in the above-described course, an end portion 506-2, a stopper member 506-3, and through holes 506a-4 and 506b-4 of the holder member 506 correspond to the end portion 406-2, the stopper member 406-3, the through holes 406a-4 and 406b-4 of the holder member 406, respectively.

EMBODIMENT 12

Next, a description will be given, with reference to FIG. 27 and FIG. 28, of still another configuration of the light source unit as a twelfth embodiment according to the present invention.

Figure 27:
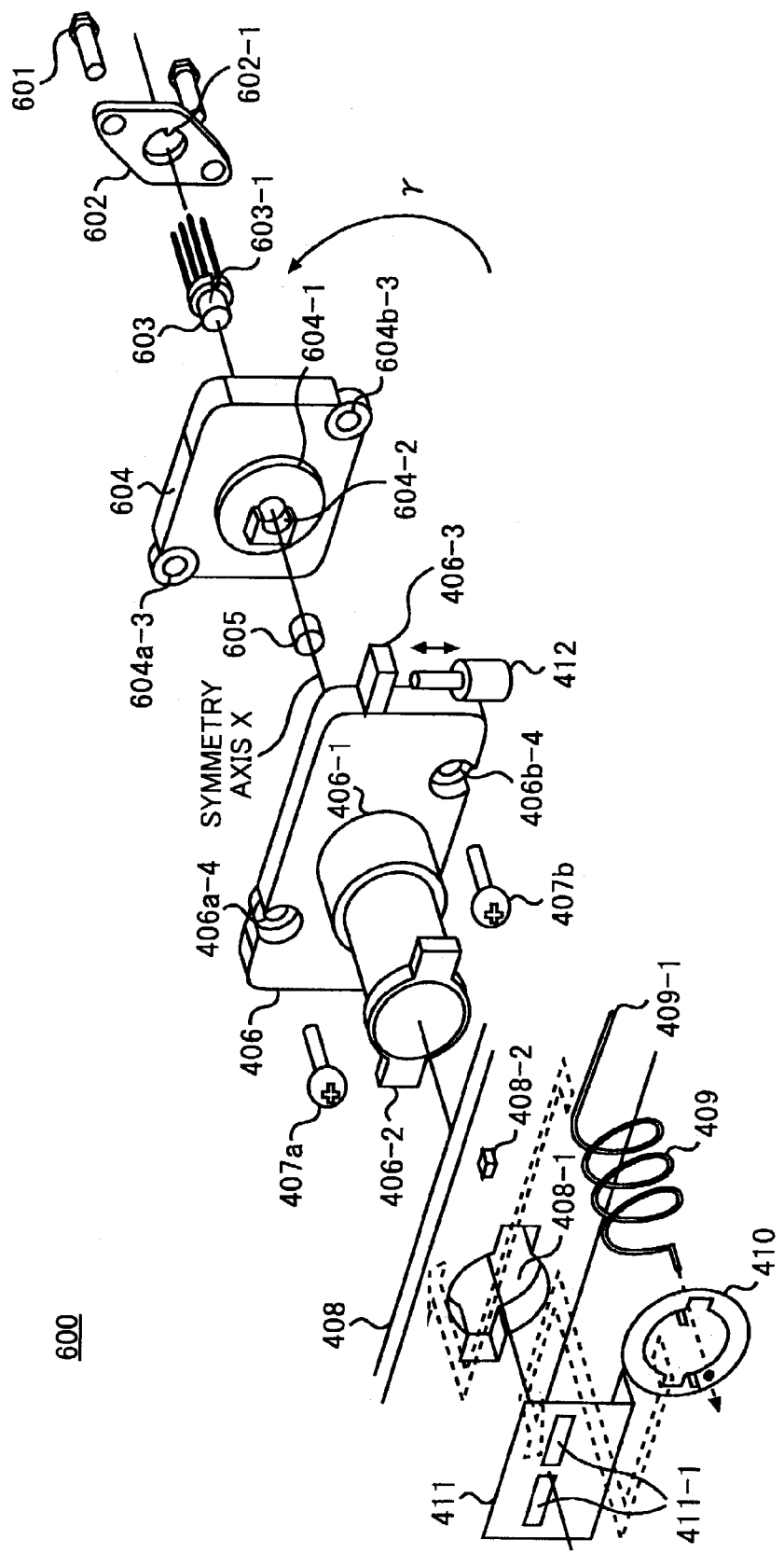
FIG. 27 is an exploded view showing a configuration of a light source unit according to a twelfth embodiment of the present invention.
Figure 28:
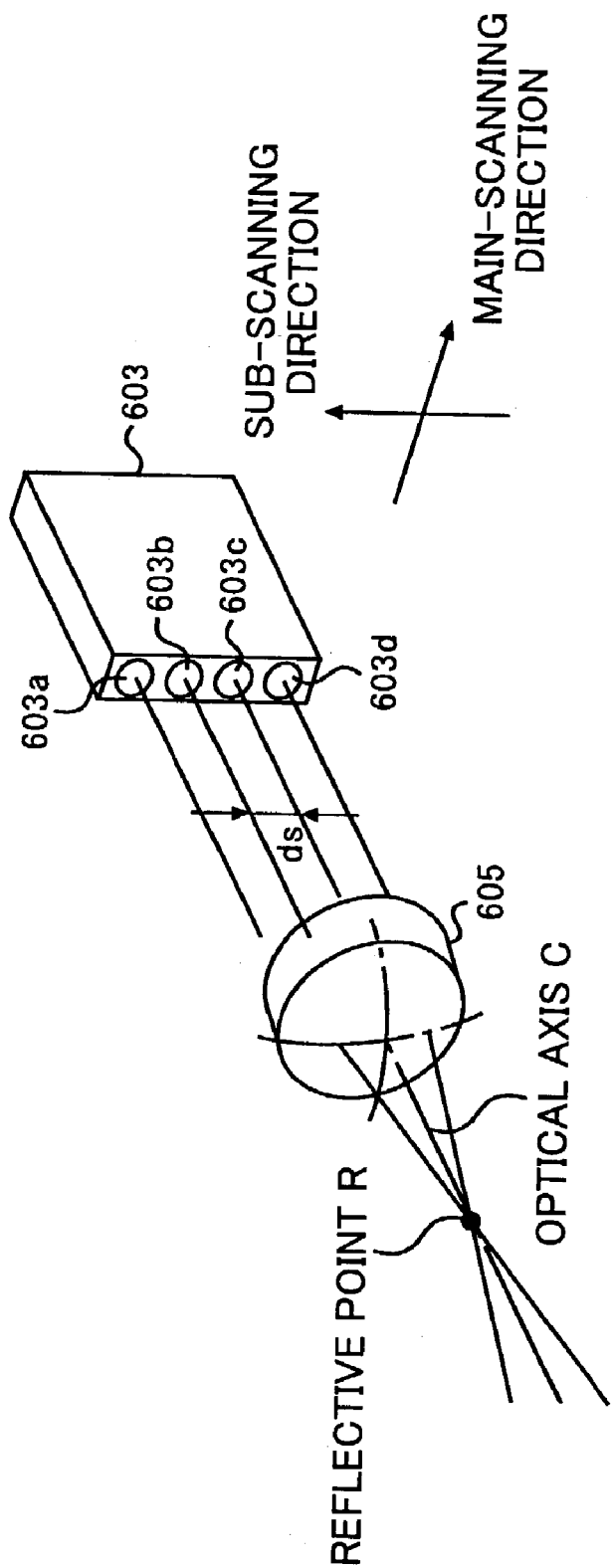
FIG. 28 is a perspective view showing an arrangement of a 4-channel semiconductor laser array and a collimate lens of the light source unit shown in FIG. 27.

FIG. 27 is an exploded view showing the configuration of a light source unit 600 according to the present twelfth embodiment. As shown in FIG. 27, the light source unit 600 uses a 4-channel semiconductor laser array 603 in place of the foregoing semiconductor laser arrays. As shown in FIG. 28, the 4-channel semiconductor laser array 603 includes four light-emitting sources 603a to 603d arranged monolithic, with intervals ds=25 μm therebetween, in the sub-scanning direction symmetrically about the optical axis C of a collimate lens 605. As shown in FIG. 27, the 4-channel semiconductor laser array 603 is inserted into a backside of a base member 604. Specifically, a cylindrical heat sink portion 603-1 of the 4-channel semiconductor laser array 603 is inserted into an insertion hole (not seen in the figure) formed at the backside of the base member 604. The inserted 4-channel semiconductor laser array 603 is pressed against the base member 604 by a pressing member 602, and is fixed with screws 601. In this course, a projection 602-1 of the pressing members 602 is set to a notch formed in the cylindrical heat sink portion 603-1 so that the light-emitting sources 603a to 603d of the 4-channel semiconductor laser array 603 are arranged in a predetermined direction.

The collimate lenses 605 is positioned by a perimeter thereof being joined along a semicircular mounting guide surface 604-2 of the base member 604.

A cylindrical engagement portion 604-1 of the base member 604 is engaged with the backside of the holder member 406. In this course, the screws 407a and 407b are screwed into screw holes 604a-3 and 604b-3 formed in the base member 604 via the through holes 406a-4 and 406b-4 formed in the holder member 406 so as to fix the base member 604 and the holder member 406 with each other, thereby forming the light source unit 600.

Besides, since other structures of the present twelfth embodiment are similar as the foregoing tenth embodiment, a description thereof is omitted herein.

OTHER EMBODIMENTS

Further, the pixel clock generation part according to the present invention can be applied not only to the above-described multi/single-beam scanning device, but also other devices scanning a scanned surface according to a pixel clock.

The present invention is not limited to the specifically disclosed embodiments, and variations and modifications may be made without departing from the scope of the present invention.

The present application is based on Japanese priority applications No. 2002-152028 filed on May 27, 2002, and No. 2002-152029 filed on May 27, 2002, the entire contents of which are hereby incorporated by reference.

What is claimed is:

1. A pixel clock generation device comprising:
   a high-frequency clock generation circuit generating a high-frequency clock;
   a transition detection circuit configured to detect a transition of a state of a pixel clock, and outputting a detection signal according to a timing of the detected transition, the transition detection circuit configured to detect the transition of the state of the pixel clock based on the high-frequency clock generated by the high-frequency clock generation circuit;
   a control signal generation circuit generating a control signal according to said detection signal and phase data indicating a transition timing of said pixel clock; and
   a pixel clock control circuit causing the state of said pixel clock to transition according to said control signal.

2. The pixel clock generation device as claimed in claim 1, wherein said detection signal has a width of one clock of said high-frequency clock.

3. The pixel clock generation device as claimed in claim 1, wherein said control signal generation circuit includes a shift register and a multiplexer.

4. The pixel clock generation device as claimed in claim 1, wherein said control signal generation circuit includes:
   a first control signal outputting part outputting a first control signal obtained by delaying said detection signal by a predetermined first number of clocks according to said high-frequency clock; and
   a second control signal outputting part outputting a second control signal according to said phase data, the second control signal being obtained by delaying said detection signal by a predetermined second number of clocks according to said high-frequency clock.

5. The pixel clock generation device as claimed in claim 4, wherein said first control signal outputting part is composed of a first shift register having a predetermined first number of steps; and
   said second control signal outputting part is composed of a second shift register having a predetermined second number of steps, and a multiplexer selecting a signal according to said phase data from among signals output from said predetermined second number of said steps so as to output the selected signal as said second control signal.

6. The pixel clock generation device as claimed in claim 5, wherein said second shift register includes said first shift register.

7. The pixel clock generation device as claimed in claim 1, further comprising a phase data decode circuit decoding said phase data,
   wherein said control signal generation circuit generates said control signal according to said detection signal and the decoded phase data.

8. The pixel clock generation device as claimed in claim 1, further comprising a phase data storage circuit storing at least one phase data, and outputting the stored phase data one by one in synchronization with said pixel clock,
   wherein said control signal generation circuit generates said control signal according to said detection signal and the phase data output from said phase data storage circuit.

9. The pixel clock generation device as claimed in claim 8, wherein said phase data storage circuit stores said phase data for each line beforehand, and outputting the stored phase data one by one in synchronization with said pixel clock each time a line is scanned.

10. The pixel clock generation device as claimed in claim 1, further comprising:
    a phase data storage circuit storing at least one phase data, and outputting the stored phase data one by one in synchronization with said pixel clock; and
    a phase data decode circuit decoding the phase data output from said phase data storage circuit,
    wherein said control signal generation circuit generates said control signal according to said detection signal and the phase data decoded by said phase data decode circuit.

11. The pixel clock generation device as claimed in claim 10, wherein said phase data storage circuit stores said phase data for each line beforehand, and outputting the stored phase data one by one in synchronization with said pixel clock each time a line is scanned.

12. The pixel clock generation device as claimed in claim 1, further comprising:
    a phase data storage circuit storing at least one first phase data, and outputting the stored first phase data one by one in synchronization with said pixel clock; and
    a phase data synthesis circuit synthesizing the first phase data output from said phase data storage circuit and second phase data so as to create third phase data,
    wherein said control signal generation circuit generates said control signal according to said detection signal and said third phase data created by said phase data synthesis circuit.

13. The pixel clock generation device as claimed in claim 12, further comprising a phase data decode circuit decoding said third phase data output from said phase data synthesis circuit,
    wherein said control signal generation circuit generates said control signal according to said detection signal and the third phase data decoded by said phase data decode circuit.

14. The pixel clock generation device as claimed in claim 13, wherein said phase data storage circuit stores said first phase data for each line beforehand, and outputting the stored first phase data one by one in synchronization with said pixel clock each time a line is scanned, and
    said phase data synthesis circuit synthesizes the first phase data output from said phase data storage circuit and said second phase data supplied for each line so as to create said third phase data.

15. The pixel clock generation device as claimed in claim 12, wherein said phase data storage circuit stores said first phase data for each line beforehand, and outputting the stored first phase data one by one in synchronization with said pixel clock each time a line is scanned, and
    said phase data synthesis circuit synthesizes the first phase data output from said phase data storage circuit and said second phase data supplied for each line so as to create said third phase data.

16. A pixel clock generation device comprising:
a high-frequency clock generation part generating a high-frequency clock;
a clock generation part generating a plurality of clocks having at least one of different phases and different periods according to phase data indicating a phase shift amount of a pixel clock, a status signal indicating a state of said pixel clock, and said high-frequency clock;
a clock selecting part selecting either of said clocks according to said phase; and
a pixel clock control circuit configured to control the pixel clock to rise when a clock selected by the clock selecting part rises.

17. The pixel clock generation device as claimed in claim 16, wherein said clock generation part includes:
a control data generation part generating a plurality of control data for controlling at least one of phases and periods of said clocks according to said phase data and said status signal;
a transition detection part detecting transitions of states of said clocks, respectively, so as to generate detection signals;
a control signal generation part generating control signals indicating timings for controlling at least one of phases and periods of said clocks, respectively, according to said detection signals and said control data; and
a state transition part causing the states of said clocks to transition according to said control signals, respectively.

18. The pixel clock generation device as claimed in claim 17, wherein each of said detection signals is a pulse signal having a width of one clock of said high-frequency clock.

19. The pixel clock generation device as claimed in claim 17, wherein said control signal generation part includes:
a shift register generating a plurality of signals having phases shifted according to said high-frequency clock; and
a multiplexer selecting either of said signals according to said control data.

20. The pixel clock generation device as claimed in claim 17, wherein said control data generation part stores a plurality of the control data corresponding to said phase data and said status signal.

21. The pixel clock generation device as claimed in claim 17, further comprising a phase data storage part storing at least one phase data, and outputting the stored phase data one by one in synchronization with said pixel clock,
wherein said control data generation part generates said plurality of said control data according to the phase data output from said phase data storage part and said status signal.

22. The pixel clock generation device as claimed in claim 21, wherein said phase data storage part stores said phase data for each line beforehand, and outputting the stored phase data one by one in synchronization with said pixel clock each time a line is scanned.

23. The pixel clock generation device as claimed in claim 17, further comprising:
a phase data storage part storing at least one first phase data, and outputting the stored first phase data one by one in synchronization with said pixel clock; and
a phase data synthesis part synthesizing the first phase data output from said phase data storage part and second phase data so as to create third phase data,
wherein said control data generation part generates said plurality of said control data according to said third phase data created by said phase data synthesis part and said status signal.

24. The pixel clock generation device as claimed in claim 23, wherein each of said first phase data and said second phase data is composed of predetermined bits, and
said phase data synthesis part performs an addition of said first phase data and said second phase data so as to create said third phase data.

25. The pixel clock generation device as claimed in claim 24, wherein said phase data synthesis part discards higher-order bits exceeding said predetermined bits from a result of said addition.

26. The pixel clock generation device as claimed in claim 23, wherein said phase data storage part stores said first phase data for each line beforehand, and outputting the stored first phase data one by one in synchronization with said pixel clock each time a line is scanned, and
said phase data synthesis part synthesizes the first phase data output from said phase data storage part and said second phase data supplied for each line so as to create said third phase data.

27. The pixel clock generation device as claimed in claim 16, wherein said clock selecting part selects either one of said clocks according to a selection signal toggled according to said phase data.

28. The pixel clock generation device as claimed in claim 16, wherein said clock generation part generates a first clock having a state transiting upon rising of said high-frequency clock, and a second clock having a state transiting upon falling of said high-frequency clock.

29. A laser scanning device emitting a light beam for scanning a scanned medium by driving a light source according to a pixel clock, the device comprising:
the light source emitting said light beam;
a pixel clock generation device including a high-frequency clock generation circuit generating a high-frequency clock, a transition detection circuit configured to detect a transition of a state of a pixel clock, and outputting a detection signal according to a timing of the detected transition, the transition detection circuit configured to detect the transition of the state of the pixel clock based on the high-frequency clock generated by the high-frequency clock generation circuit, a control signal generation circuit generating a control signal according to said detection signal and phase data indicating a transition timing of said pixel clock, and a pixel clock control circuit causing the state of said pixel clock to transition according to said control signal; and
a drive part driving said light source according to said pixel clock output from said pixel clock generation device.

30. A laser scanning device emitting a plurality of light beams for scanning a scanned medium by driving a plurality of light sources according to a pixel clock, the device comprising:
the light sources emitting said light beams;
a pixel clock generation device including a high-frequency clock generation circuit generating a high-frequency clock, a transition detection circuit configured to detect a transition of a state of a pixel clock, and outputting a detection signal according to a timing of the detected transition, the transition detection circuit configured to detect the transition of the state of the pixel clock based on the high-frequency clock generated by the high-frequency clock generation circuit, a control signal generation circuit generating a control signal according to said detection signal and phase data indicating a transition timing of said pixel clock, and a pixel clock control circuit causing the state of said pixel clock to transition according to said control signal; and a drive part driving said light sources according to said pixel clock output from said pixel clock generation device.

31. The laser scanning device as claimed in claim 30, wherein said light sources are arranged symmetrically and rotatably about a predetermined rotation axis, and optical axes of said light sources each have a predetermined angle from said predetermined rotation axis so as to cross one another in a reflective plane of a deflector deflecting said light beams.

32. A laser scanning device emitting a light beam for scanning a scanned medium by driving a light source according to a pixel clock, the device comprising:

the light source emitting said light beam;

a pixel clock generation device including a high-frequency clock generation part generating a high-frequency clock, a clock generation part generating a plurality of clocks having at least one of different phases and different periods according to phase data indicating a phase shift amount of a pixel clock, a status signal indicating a state of said pixel clock, and said high-frequency clock, a clock selecting part selecting either of said clocks according to said phase data, and a pixel clock control circuit configured to control the pixel clock to rise when a clock selected by the clock selecting part rises; and a drive part driving said light source according to said pixel clock output from said pixel clock generation device.

33. A laser scanning device emitting a plurality of light beams for scanning a scanned medium by driving a plurality of light sources according to a pixel clock, the device comprising:

the light sources emitting said light beams;

a pixel clock generation device including a high-frequency clock generation part generating a high-frequency clock, a clock generation part generating a plurality of clocks having at least one of different phases and different periods according to phase data indicating a phase shift amount of a pixel clock, a status signal indicating a state of said pixel clock, and said high-frequency clock, a clock selecting part selecting either of said clocks according to said phase data, and a pixel clock control circuit configured to control the pixel clock to rise when a clock selected by the clock selecting part rises; and a drive part driving said light sources according to said pixel clock output from said pixel clock generation device.

34. The laser scanning device as claimed in claim 33, wherein said light sources are arranged symmetrically and rotatably about a predetermined rotation axis, and optical axes of said light sources each have a predetermined angle from said predetermined rotation axis so as to cross one another in a reflective plane of a deflector deflecting said light beams.

35. An image forming device forming an image on a scanned medium by driving a light source according to a pixel clock, the device comprising:

a laser scanning device including;

the light source emitting a light beam for scanning said scanned medium;

a pixel clock generation device including a high-frequency clock generation circuit generating a high-frequency clock, a transition detection circuit configured to detect a transition of a state of a pixel clock, and outputting a detection signal according to a timing of the detected transition, the transition detection circuit configured to detect the transition of the state of the pixel clock based on the high-frequency clock generated by the high-frequency clock generation circuit, a control signal generation circuit generating a control signal according to said detection signal and phase data indicating a transition timing of said pixel clock, and a pixel clock control circuit causing the state of said pixel clock to transition according to said control signal; and a drive part driving said light source according to said pixel clock output from said pixel clock generation device.

36. An image forming device forming an image on a scanned medium by driving a plurality of light sources according to a pixel clock, the device comprising:

a laser scanning device including:

the light sources emitting a plurality of light beams for scanning said scanned medium;

a pixel clock generation device including a high-frequency clock generation circuit generating a high-frequency clock, a transition detection circuit configured to detect a transition of a state of a pixel clock, and outputting a detection signal according to a timing of the detected transition, the transition detection circuit configured to detect the transition of the state of the pixel clock based on the high-frequency clock generated by the high-frequency clock generation circuit, a control signal generation circuit generating a control signal according to said detection signal and phase data indicating a transition timing of said pixel clock, and a pixel clock control circuit causing the state of said pixel clock to transition according to said control signal; and a drive part driving said light sources according to said pixel clock output from said pixel clock generation device.

37. The image forming device as claimed in claim 36, further comprising a phase data retaining part retaining the phase data for each of said light sources, wherein said pixel clock generation device generates said pixel clock for each of said light sources according to said phase data for each of said light sources, and said drive part drives said light sources according to said pixel clock generated for each of said light sources by said pixel clock generation device.

38. An image forming device forming an image on a scanned medium by driving a light source according to a pixel clock, the device comprising:

a laser scanning device including;

the light source emitting a light beam for scanning said scanned medium;

a pixel clock generation device including a high-frequency clock generation part generating a high-frequency clock, a clock generation part generating a plurality of clocks having at least one of different phases and different periods according to phase data indicating a phase shift amount of a pixel clock, a status signal indicating a state of said pixel clock, and said high-frequency clock, a clock selecting part selecting either of said clocks according to said phase data, and a pixel clock control circuit configured to control the pixel clock to rise when a clock selected by the clock selecting part rises; and a drive part driving said light source according to said pixel clock output from said pixel clock generation device.

39. An image forming device forming an image on a scanned medium by driving a plurality of light sources according to a pixel clock, the device comprising:

a laser scanning device including;

the light sources emitting a plurality of light beams for scanning said scanned medium;

a pixel clock generation device including a high-frequency clock generation part generating a high-frequency clock, a clock generation part generating a plurality of clocks having at least one of different phases and different periods according to phase data indicating a phase shift amount of a pixel clock, a status signal indicating a state of said pixel clock, and said high-frequency clock, a clock selecting part selecting either of said clocks according to said phase data, and a pixel clock control circuit configured to control the pixel clock to rise when a clock selected by the clock selecting part rises; and a drive part driving said light sources according to said pixel clock output from said pixel clock generation device.

40. The image forming device as claimed in claim 39, further comprising a phase data retaining part retaining the phase data for each of said light sources, wherein said pixel clock generation device generates said pixel clock for each of said light sources according to said phase data for each of said light sources, and said drive part drives said light sources according to said pixel clock generated for each of said light sources by said pixel clock generation device.

* * * * *